(12) United States Patent
Fraccalvieri et al.

(10) Patent No.: US 8,089,875 B2
(45) Date of Patent: Jan. 3, 2012

(54) NETWORK REAL TIME MONITORING AND CONTROL SYSTEM

(75) Inventors: Donato Fraccalvieri, Santeramo in Colle (IT); Marco D'Aleo, Rome (IT); Luigi Forlano, Rome (IT)

(73) Assignee: Accenture Global Services Limited, Dublin (IE)

( * ) Notice: Subject to any disclaimer, the term of this patent is extended or adjusted under 35 U.S.C. 154(b) by 154 days.

(21) Appl. No.: 12/535,538

(22) Filed: Aug. 4, 2009

(65) Prior Publication Data

US 2010/0296402 A1    Nov. 25, 2010

(30) Foreign Application Priority Data

May 20, 2009   (EP) .................................... 09425194

(51) Int. Cl.
*H04J 1/16* (2006.01)
(52) U.S. Cl. ..................... 370/230.1; 370/252
(58) Field of Classification Search .................. 370/229, 370/230, 230.1, 235, 241, 252
See application file for complete search history.

(56) References Cited

U.S. PATENT DOCUMENTS

| | | | |
|---|---|---|---|
| 7,509,425 | B1 | 3/2009 | Rosenberg |
| 7,711,751 | B2 | 5/2010 | Kelley et al. |
| 7,733,787 | B1 | 6/2010 | Paterson et al. |
| 7,822,849 | B2 | 10/2010 | Titus |
| 2005/0138111 | A1* | 6/2005 | Aton et al. ..................... 709/201 |
| 2007/0081543 | A1 | 4/2007 | Brenes |
| 2007/0211631 | A1* | 9/2007 | Rahman et al. ............... 370/230 |
| 2008/0002576 | A1* | 1/2008 | Bugenhagen et al. ........ 370/229 |
| 2008/0037552 | A1 | 2/2008 | Dos Remedios |
| 2008/0049615 | A1 | 2/2008 | Bugenhagen |
| 2008/0052394 | A1 | 2/2008 | Bugenhagen |
| 2008/0112319 | A1 | 5/2008 | Saegusa |
| 2010/0296402 | A1 | 11/2010 | Fraccalvieri et al. |

FOREIGN PATENT DOCUMENTS

EP    1 701 487 A1    9/2006

OTHER PUBLICATIONS

Extended European search report for European Application No. 09425193.1, mailed Oct. 15, 2009.
Extended European search report for European Application No. 09425194.9, mailed Sep. 23, 2009.
S. Blake et al., An Architecture for Differentiated Services, The Internet Society, Dec. 1998.

* cited by examiner

*Primary Examiner* — Kwang B Yao
*Assistant Examiner* — Obaidul Huq
(74) *Attorney, Agent, or Firm* — Brinks Hofer Gilson & Lione

(57) ABSTRACT

A network real-time monitoring and control system includes several layers of components for generating a network traffic shaping control that is used to shaping network traffic flows for one or more network nodes. The layers of the network real-time monitoring and control system include a monitoring layer, an event control layer, a traffic shaping control layer, a reporting layer, and an administrative layer. The monitoring obtains network traffic indicator measurements and network node operational indicator measurements. The event control layer uses the indicator measurements to generate a network event identifier, and generates a request for a network traffic shaping control based on a correlation of the network event identifier with a network node status identifier. The request for the network traffic shaping control is communicated to the traffic shaping control layer to generate a network traffic shaping control.

20 Claims, 14 Drawing Sheets

| Status Identifier | Status Condition | Scenario | Priority |
|---|---|---|---|
| R1 | One or more Input SIP INVITE critical thresholds have exceeded | • High INVITE traffic increase<br>• Burst of INVITE traffic | 2 |
| R2 | One or more Input SIP REGISTER critical thresholds have exceeded | • High REGISTER traffic increase<br>• Burst of REGISTER traffic | 1 |
| R3 | One or more Input SIP INVITE warning thresholds and two or more performance measurement warning threshold have exceeded | • Low INVITE traffic increase<br>• SS suffering condition:<br>  • High CPU workload<br>  • High memory workload | 6 |
| R4 | One or more Input SIP REGISTER warning thresholds and two or more performance measurement warning thresholds have exceeded | • Low REGISTER traffic increase<br>• SS suffering condition:<br>  • High CPU workload<br>  • High memory workload | 5 |
| R5 | One or more Input and Output SIP INVITE warning thresholds and two or more performance measurement warning thresholds have exceeded | • Low INVITE traffic increase<br>• SS suffering condition:<br>  • High CPU workload<br>  • High Memory workload<br>  • High response time | 4 |
| R6 | One or more Input and Output SIP REGISTER warning thresholds and two or more performance measurement warning thresholds have exceeded | • Low REGISTER traffic increase<br>• SS suffering condition:<br>  • High CPU workload<br>  • High memory workload<br>  • High response time | 3 |

FIG. 4

NETWORK REAL TIME MONITORING AND CONTROL SYSTEM

PRIORITY CLAIM

This application claims the benefit of EPO Patent Application No. 09425194.9 filed May 20, 2009, which is incorporated herein by reference in its entirety.

CROSS-REFERENCE TO RELATED APPLICATIONS

Co-pending and commonly assigned U.S. patent application Ser. No. 12/535,571, titled "Control Management of Voice-Over-IP Parameters," and assigned, has been filed on the same date as the present application, and is incorporated herein by reference in its entirety.

BACKGROUND

1. Technical Field

This application relates to a network real-time monitoring and control system and, in particular, a network real-time monitoring and control system that outputs a network traffic shaping control based on correlating a network event identifier with a network node status identifier.

2. Related Art

A Public Switch Telephone Network ("PSTN") typically provides the system architecture for implementing telecommunication services. However, implementing telecommunication services over a PSTN can sometimes be expensive and time-consuming. Moreover, the equipment in which a provider must invest in to provide telecommunication services on a PSTN can be expensive, as well as the costs for leasing access to the PSTN. Hence, an entity that desires to enter the telecommunications marketplace would prefer an alternative to using a PSTN for providing telecommunication services.

Since the advent of the Internet, more and more entities are turning to the use of a packet-switched Next Generation Network ("NGN"). In general, NGN focuses on the concept of one network transporting all information and services (voice, data, and all sorts of media such as video) by encapsulating these into packets, like it is on the Internet. In addition, an NGN may provide telecommunication services and be able to make use of multiple broadband, Quality of Service-enabled transport technologies. Furthermore, the service-related functions of an NGN may be independent from underlying transport-related technologies. An NGN may also offer unrestricted access by users to different service providers.

One of the telecommunication services provided by a telecommunication service provider using an NGN may be Voice-Over-Internet-Protocol ("VoIP") service. In general, a VoIP service employs session control protocols to control the set-up and tear-down of calls over a packet-switched network, such as an NGN. A VoIP service may also provide audio encoding algorithms that digitally encode speech for transmission over the packet-switched network.

As VoIP is a desirable competitor to traditional telecommunication services, a telecommunication service provider may desire to enter the telecommunications marketplace by providing VoIP service over an NGN. However, a telecommunication service provider seeking to implement VoIP services over an NGN faces unique challenges. Examples of these challenges include providing quality service during peak usage times and providing service when the number of concurrent VoIP calls meets or exceeds the number of concurrent attempted calls served by the telecommunication service provider.

SUMMARY

This application provides for a network real-time monitoring and control system that monitors and the controls the service of VoIP calls through traffic shaping. In one implementation, the network real-time monitoring and control system includes a real-time network monitor, an event manager, a real-time status analyzer, and a control manager. The real-time network monitor monitors the traffic flow of a network node in communication with the network real-time monitoring and control system. In addition, the real-time network monitor may monitor specific indicators of traffic flow, such as signaling indicators, media treatment indicators, provisioning indicators, and others. The real-time network monitor may also monitor the performance of the network node in communication with the real-time monitoring and control system. The real-time network monitor may store one or more measurements indicative of the traffic flow or performance of the network node.

The event manager generates events that may be defined according to changes in traffic flows, changes in the performance of the network node, or both. For example, an event may be defined by whether a network node is accessible, or whether there is an increase in a traffic flow or in a network traffic indicator. In one implementation, the event manager compares the measurements taken by the real-time network monitor and compares the measurements with a previously stored threshold. An event may be defined by whether the comparison of the measurements with the previously stored threshold indicates that the measurements exceed or fall below the previously stored threshold. The event manager may also calculate performance measurements based on the measurements from the real-time network monitor, and compare the performance measurements with previously stored thresholds to determine whether an event should be generated.

The real-time status analyzer correlates events generated by the event manager to determine the network status of the network node, the traffic flows, and the general network health of the telecommunication service provider. In one implementation, the real-time status analyzer correlates the generated events with network node status identifiers defined by a network node status rule set. Each of the network node status identifiers may be associated with a network node status condition that identifies the network node status identifier when the network node status condition is satisfied. The network node status rule set may also associate network node status condition priorities with the network node status conditions. A network node status condition priority may indicate a priority level of a network node status condition such that a first network node status condition has a higher priority level than a second network node status condition. It is also possible that one or more network node status conditions have the same priority level.

Once the real-time status analyzer has correlated a generated event with a network node status, the real-time status analyzer generates a request for a network traffic shaping control. In general, a network traffic shaping control defines the behavior for a network traffic shaping appliance. In one implementation, the request is output as a suggestion to a user, who may then accept the request for the network traffic shaping control or may reject the request for the network traffic shaping control. In an alternative implementation, the request for the network traffic shaping control may be output to an automatic system that implements the network traffic shaping control, such as the control manager, which is described in more detail below.

The control manager is operative to implement the network traffic shaping control requested by the real-time status analyzer. In one implementation, the control manager automatically outputs the network traffic shaping control. In an alternative implementation, the control manager outputs the network traffic shaping control when the real-time status analyzer receives an acceptance of the network traffic shaping control. In implementing the network traffic shaping control, the control manager may calculate a network traffic shaping control intensity that specifies a network traffic intensity for the traffic flow or network node that triggered the request for the network traffic shaping control. The control manager may also specify additional parameters for the network traffic shaping control. Once implemented, the control manager outputs the network traffic shaping control to another system or device, such as a network traffic shaping appliance. While the network traffic shaping control is controlling the traffic flow or network node, the control manager handles the duration and termination of the network traffic shaping control.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 4 shows one example of a network node status rule set for correlating events with the status of a network node.

DETAILED DESCRIPTION OF THE PREFERRED EMBODIMENTS

Figure 1:
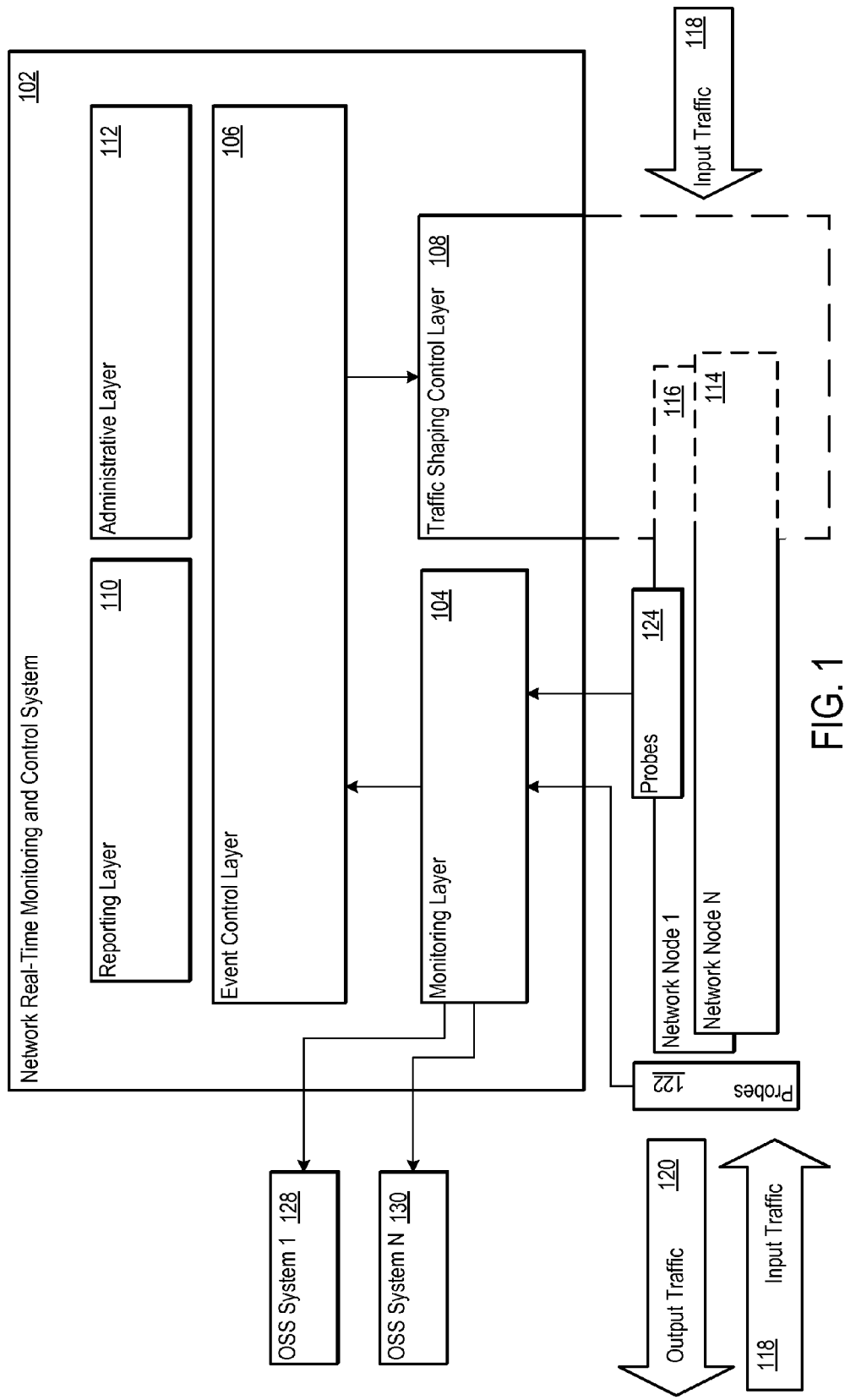
FIG. 1 shows one example of a network real-time monitoring and control system.

FIG. 1 shows one example of a network real-time monitoring and control system 102 for monitoring and controlling network traffic flow input and output by one or more network nodes. The network real-time monitoring and control system 102 includes several layers for monitoring and controlling the input and output network traffic flow. In one implementation, the network real-time monitoring and control system 102 includes a monitoring layer 104, an event control layer 106, a traffic shaping control layer 108, a reporting layer 110, and an administrative layer 112.

The network real-time monitoring and control system 102 is in communication with one or more network nodes 114-116. In general, a network node is an electronic device capable of sending, receiving, or forwarding information over a communications channel. The network nodes 114-116 may be any type of network node. For example, one or more of the network nodes 114-116 may be data circuit-terminating equipment (DCE) such as a modem, hub, bridge or switch. Alternatively, the network nodes 114-116 may be data terminal equipment (DTE), such as a digital telephone handset, a printer or a computer. Other examples of network nodes 114-116 include a router, a workstation or a server. Additional examples of network nodes 114-116 include a public or private telephone exchange, a remote concentrator or a computer providing network service. In one implementation, the network nodes 114-116 are Session Initiation Protocol ("SIP") Servers, Home Subscriber Servers, SIP Application Servers, carrier-class session border controllers, such as the Acme Packet Net-Net 4250 or Acme Packet Net-Net 4500, available from Acme Packet located in Burlington, Mass., United States.

The network nodes 114-116 receive input network traffic flows 118 and transmit output network traffic flows 120. The input network traffic flows 118 and output network traffic flows 120 may include different types of network traffic. In one example the input network traffic flows 118 may include signaling network traffic. An example of signaling network traffic includes network traffic from SIP network traffic, such as SIP REQUEST messages, SIP REGISTER messages, and other SIP messages. Another example of signaling network traffic is Real-Time Streaming Protocol ("RTSP") network traffic. Signaling network traffic may also include network traffic from umbrella system specifications, such as the H.323 system specification that describes the use of several Telecommunication Standardization Sector ("ITU-T") and Internet Engineering Task Force ("IETF") protocols. Other types of signaling network traffic are also contemplated.

The input network traffic flows 118 may further include media treatment network traffic. An example of media treatment network traffic includes the Real-Time Transport Protocol ("RTP") network traffic. However, media treatment network traffic may also include other protocol network traffic that manages the real-time transmission of multimedia data over unicast or multicast network services, a fax relay standard, such as T.38, or other protocol network traffic.

Furthermore, the input network traffic flows 118 may include provisioning network traffic. In general, provisioning network traffic refers to network traffic that includes messages directed to the request for the provisioning of a telecommunication. However, provisioning network traffic may also include network traffic that is related to the first activation of a service for a given user. Other types of provisioning network traffic are also contemplated.

The output network traffic flows 120 may include network traffic output by one or more of the network nodes 114-116. For example, the output network traffic flows 120 may include responses to the messages of the input network traffic flows 118. In one implementation, the output network traffic flows 120 include responses to SIP network traffic. Responses to SIP network traffic include informational responses, such as TRYING responses, RINGING responses, and other informational responses; successful responses, such as OK responses, ACCEPTED responses, and other successful responses; redirection responses, such as MULTIPLE CHOICES responses, MOVED PERMANENTLY responses, and other redirection responses; and, other types of SIP network traffic responses. The output network traffic flows 120 may also include responses to media treatment network traffic, provisioning network traffic, and other types of network traffic.

The input network traffic flows 118 and output network traffic flows 120 may also include network traffic in addition to signaling, media treatment, and provisioning network traffic flows. For example, the input network traffic flows 118 may include Address Resolution Protocol ("ARP") network traffic, Domain Name System ("DNS") Protocol network traffic, Transmission Control Protocol ("TCP") network traffic, Hyper Text Transfer Protocol ("HTTP") network traffic, and other types of network traffic. Similarly, the output network traffic flows 120 may include responses to the aforementioned network traffic.

The monitoring layer 104 monitors the input network traffic flows 118 and output network traffic flows 120 of the network nodes 114-116. By monitoring the input network traffic flows 118, the network real-time monitoring and control system 102 can identify when one or more of the network nodes 114-116 begins to destabilize or reach an instability status. For example, during an increase in SIP input network traffic, the network nodes 114-116 may be unable to satisfy all the SIP input network traffic flows 118. In these situations, the network nodes 114-116 may destabilize, and the quality of service provided to the SIP input network traffic may suffer.

Similar to preventing the destabilization of the network nodes 114-116 through the monitoring of input network traffic flows 118, the real-time monitoring and control system 102 may also prevent the destabilization of the network nodes 114-116 through the monitoring of the output network traffic flows 120. By monitoring the output network traffic flows 120, the network real-time monitoring and control system 102 can identify when one or more of the network nodes 114-116 begins to destabilize or reach an instability status. For example, during an increase in SIP output network traffic, an increase in response output network traffic, or an increase in output network traffic, the network nodes 114-116 may be unable to maintain the level of output required to satisfy all of the output network traffic flows 120. In these situations, the network nodes 114-116 may destabilize, and the quality of service transmitted by the network nodes 114-116 may suffer. Furthermore, because the amount of outgoing network traffic may correlate to the amount of incoming network traffic, there is a high probability that the incoming network traffic has caused the increase in outgoing network traffic. Hence, by monitoring the output network traffic flows 120, the network real-time monitoring and control system 102 can control the amount of incoming input network traffic and prevent the destabilization of the network nodes 114-116.

In monitoring the input network traffic flows 118 and output network traffic flows 120, the monitoring layer 104 may establish one or more network traffic flow identifiers that identify the network traffic flows 118-120. The network traffic flow identifiers may be stored in the monitoring layer 104 or in another layer of the network real-time monitoring and control system 102, such as the event control layer 106.

The real-time network and control system 102 may communicate with one or more probes 122 via the monitoring layer 104 to monitor the input and output network traffic flows 118-120. In general, a network traffic probe 122 is a network appliance that analyzes the network traffic flows to obtain a network traffic indicator measurement that provides a measurement of a network traffic indicator for a network node. As discussed with reference to FIG. 2, a network traffic indicator may represent a particular network traffic type received or transmitted by a network node. The network traffic probe 122 may obtain the network traffic indicator measurement, and then expose the network traffic indicator measurement to the network real-time monitoring and control system 102 via a communication protocol, such as the Simple Network Management Protocol ("SNMP").

In one implementation, the network traffic probe 122 is includes one or more components. For example, the network traffic probe 122 may include a packet analyzer and a statistic generator. Other components are also possible. In general, a packet analyzer is computer software or hardware that intercepts and logs network traffic passing over a network or part of a network. One example of a software packet analyzer is Wireshark, which is available from the Wireshark Foundation located in Davis, Calif., United States. The statistic generator is computer software or hardware that generates statistics associated with the network packets analyzed by the packet analyzer. Examples of statistics generated by the statistic generator may include the number of packets analyzed, the number of packets analyzed for a particular network traffic type, or other statistic. The statistic generator may also be configured to monitor network traffic indicators and obtain monitored network traffic indicator measurements from the monitored network traffic indicators. Other statistic operations by the statistic generator may also be possible.

The exposure of the network traffic indicator measurement may occur after the network traffic indicator measurement is obtained, or may occur in real-time while the network traffic probe 122 is acquiring the network traffic indicator measurement. Other timings for exposing the network traffic indicator measurement are also possible. In one implementation, a network probe exposing agent component of the network traffic probe 122 exposes the network traffic indicator measurement via a network traffic protocol. For example, the network probe exposing agent component may expose the network traffic indicator measurement via a network traffic protocol, such as SNMP.

In addition to monitoring the input network traffic flows 118 and the output network traffic flows 120, the monitoring layer 104 may also monitor the internal operations of the network nodes 114-116 via a network node probe 124 in communication with the network nodes 114-116 and monitoring layer 104. The network node probe 124 may be implemented in computer hardware, software, or a combination of computer hardware and software. In one implementation, the network node probe 124 is implemented in software and includes a statistic generator and a network probe exposing agent.

As changes in input network traffic flows 118 and output network traffic flows 120 may not be fully indicative of the stability status of the network nodes 114-116, the network node probe 124 provides internal operation information of the network nodes 114-116, such as system information relating directly to the network nodes 114-116. For example, the network node probe 124 may provide such information as the number of computing cycles, the amount of free memory available to the network nodes 114-116, the amount of memory used by the network nodes 114-116, and other similar system information. By providing the system information to the monitoring layer 104, the network real-time monitoring and control system 102 can better account for the stability status of the network nodes 114-116.

As another example, the monitoring layer 104 may also be in communication with operation support systems 128-130. In general, an operation support system supports processes such as maintaining network inventory, provisioning services, configuring network components, and managing faults. Alternatively, or in addition, the monitoring layer 104 may also communicate with one or more business support system that support processes such as taking orders, processing bills, and collecting payments. The monitoring layer 104 may communicate with the operation support systems or business support systems to send or receive information regarding node configuration, provisioning information, performance information, or other types of information.

The network traffic indicator measurements received by the monitoring layer 104 are stored for later retrieval by an event control layer 106. The structure of the event control layer 106 is explained later with reference to FIG. 3, but, in summary, the event control layer 106 generates a network event identifier by comparing a retrieved network traffic indicator measurement with a network traffic indicator threshold. In general, a network event identifier identifies an event. Examples of events are discussed with reference to FIG. 3.

In addition, the event control layer 106 correlates the generated network event identifier with a network node status identifier. Correlating the generated network event identifier with the network node status identifier serves as one mechanism by which the event control layer 106 can determine the status of the network nodes 114-116. In general, correlating may including identifying the network node status identifier based on the generated network event identifier, matching the network node status identifier with the generated network event identifier, or otherwise determining the network node status identifier from the generated network event identifier.

With the status of the network node identified by the network node status identifier, the event control layer 106 may then generate a request for a network traffic shaping control. In general, a network traffic shaping control includes instructions and parameters to shape a network traffic flow. However, a network traffic shaping control may control additional actions other than traffic shaping actions. Examples of parameters that define a network traffic shaping control include an Internet traffic protocol, a message type, a source address, a destination address, and a network traffic shaping control intensity that identifies the amount of allowed network traffic. The network traffic shaping control intensity may identify an absolute value of the maximum allowed traffic, an absolute value of the minimum allowed traffic, or other value. However, a network traffic shaping control may define additional parameters.

The event control layer 106 communicates the network traffic shaping control request to the traffic shaping control layer 108. The traffic shaping control layer 108 then implements a network traffic shaping control according to the network traffic shaping control request. With the implemented network traffic shaping control, the traffic shaping control 108 then controls the shaping of the network traffic flow.

The network real-time monitoring and control system 102 may also include layers for reporting and administrative functions. For example, in one implementation, the network real-time monitoring and control system 102 includes a reporting layer 110 that handles the reporting functions of the network real-time monitoring and control system 102. The reporting layer 110 may include output and input functions to provide input and output to a user via graphical user interface, or to provide input and output to another system in communication with the network real-time monitoring and control system 102.

Similarly, the network real-time monitoring and control system 102 may include an administrative layer 112 that handles administrative functions of the network real-time monitoring and control system 102. The administrative layer 112 may include output and input functions to provide input and output to a user via graphical user interface, or to provide input and output to another system in communication with the network real-time monitoring and control system 102.

Figure 2:
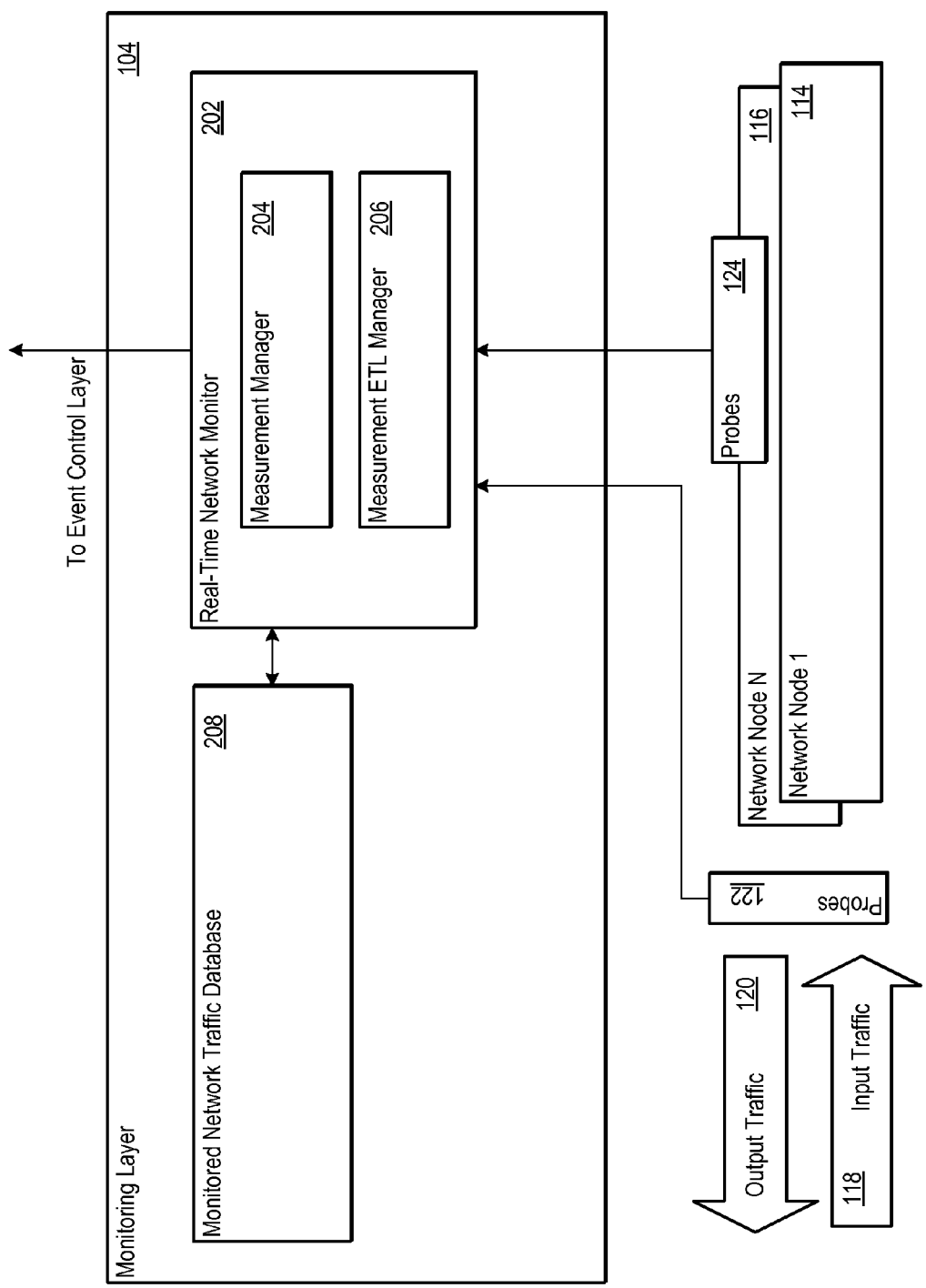
FIG. 2 shows one example of the monitoring layer of the network real-time monitoring and control system shown in FIG. 1.

Turning next to FIG. 2 is one example of the monitoring layer 104 of the network real-time monitoring and control system 102 shown in FIG. 1. The monitoring layer 104 may be implemented in hardware or software. As one example of a software implementation, the monitoring layer 104 may be implemented in the Java programming language as OpenNMS, which is an enterprise-grade network monitoring platform developed under an open source software model. OpenNMS is available from The OpenNMS Group, Inc., located in Pittsboro, N.C., United States.

In one implementation, the monitoring layer 102 includes a real-time network monitor 202 in communication with the network traffic probe 122 and the network node probe 124. The real-time monitor 202 monitors one or more of the traffic flows in communication with the network traffic probe 122. The real-time monitor 202 may monitor input traffic flows 118, output traffic flows 120, or other traffic flows. The monitored traffic flows may be for the same network node or different network nodes. As a first example, the real-time network monitor 202 monitors a first and second network traffic flow for a first network traffic node. As a second example, the real-time network monitor 202 monitors a first network traffic flow for a first network traffic node, and a second network traffic flow for a second network traffic node. Other examples and scenarios are also possible.

In monitoring the input and output network traffic flows 118-120, network real-time monitor 202 monitors one or more network traffic indicators associated with a respective network traffic flow. The network real-time monitor 202 may monitor the network traffic indicators via the network traffic probe 122. As previously mentioned, examples of network traffic indicators a signaling indicators, media treatment indicators, provisioning indicators, and other types of network traffic indicators.

By monitoring the network traffic indicators, the real-time network monitor 202 obtains a monitored network traffic indicator measurement that provides a measurement of the network traffic indicator for a network node. The real-time network monitor 202 may monitor network traffic input indicators, network traffic output indicators, or a combination of network traffic input and network traffic output indicators.

In one implementation, the input network traffic flow 118 monitored by the real-time network monitor 202 is SIP network traffic. Examples of network traffic input indicators associated with SIP network traffic include the throughput of SIP INVITE messages incoming to the network probes 114-116, the throughput of SIP REGISTER messages incoming to the network probes 114-116, and the number of re-transmitted SIP REGISTER messages. As discussed below with reference to FIG. 3, a monitored network traffic input indicator measurement, such as the measurement of the throughput of SIP INVITE messages incoming to the network probes 114-116, may be used to calculate a network performance measurement. Table 1 describes exemplary network traffic input indicators.

TABLE 1

| Network Traffic Input Indicator Type | Description |
| --- | --- |
| Throughput | The number of SIP messages. |
| Throughput | The number of SIP REGISTER messages. |
| Throughput | The number of SIP INVITE messages. |
| Throughput | The number of re-transmitted messages. |
| Throughput | The number of re-transmitted SIP REGISTER messages. |
| Throughput | The number of re-transmitted SIP INVITE messages. |
| Syntax and Semantic | Percentage of the number of malformed requests. |

In addition to network traffic input indicators, the real-time network monitor 202 may monitor network traffic output indicators associated with one or more output network traffic flows 120. Using SIP network traffic as an example, the real-time network monitor 202 may monitor such network traffic output indicators as the response time to answer SIP INVITE messages output from a network node, the response time to answer SIP REGISTER messages output from a network node, or another network traffic output indicators. Table 2 below describes exemplary network traffic output indicators.

TABLE 2

| Network Traffic Output Indicator Type | Description |
| --- | --- |
| Throughput | The number of SIP messages. |
| Throughput | The number of SIP REGISTER messages. |
| Throughput | The number of SIP INVITE messages. |
| Syntax and Semantic | Percentage of the number of messages that are redirection or failure responses. |
| Syntax and Semantic | Percentage of the number of malformed requests. |
| Response Time | The maximum response time at the 95th percentile for SIP messages. |
| Transmission Quality | The mean packet loss for an established SIP session. |
| Transmission Quality | The mean packet delay for an established SIP session. |

In determining response time for the network traffic output indicators, the real-time network monitor 202 may monitor for incoming messages having a specific payload. For example, to determine the response time for SIP INVITE messages output from a network node, the real-time network monitor 202 may monitor for response messages having a specific SIP status code, such as an SIP status code of 180 ("Ringing"), 183 ("Session Progress"), 200 ("OK"), or other SIP status code. Alternatively, the real-time network monitor 202 may monitor for response messages having a range of SIP status codes, such as SIP status codes in the range of 300-699. Similarly, to determine the response time to answer SIP REGISTER messages, the real-time network monitor 202 may monitor for response messages having a specific SIP status code, or response messages having an SIP status code from a range of SIP status codes, such as SIP status codes in the range of 200-699.

By monitoring network traffic indicators, the real-time network monitor 202 can keep the real-time monitoring and control system 102 informed as to whether the network nodes 114-116 are meeting the network needs of the network traffic flows 118-120. Moreover, the real-time monitoring and control system 102 can use the network traffic indicator measurements to determine the stability status of the network nodes 114-116. Fluctuations in network traffic indicator measurements may indicate that one or more network nodes 114-116 are experiencing instability, an increase or decrease in network traffic, or that one of the network nodes 114-116 is about to suffer an outage.

In addition to network traffic indicators, the real-time network monitor 202 may also monitor network node operational indicators via network node probe 124. As monitoring the network traffic flows 118-120 may not provide complete information relating to the stability status of the network nodes 114-116, the monitored network node operational indicators provide information relating directly to the network nodes 114-116. Examples of monitored network node operational indicators include the idle CPU quantity, the quantity of CPU used by the kernel of the network node, the quantity of CPU used by user processes of the network node, the quantity of CPU used by processes waiting for input/output resources, the quantity of CPU used to verify interrupts, the total quantity of memory installed, the total quantity of available memory, the number of requests on a database, or other operational indicators. The operational indicator measurements of the operational indicators may be used to calculate additional measurements, such as time-derivative measurements. Furthermore, monitoring the network node operational indicators provides an indication as to the stability status of the network node that may not be apparent from monitoring the network traffic indicators. Table 3 below describes exemplary network node operational indicators.

TABLE 3

| Network Node Operational Indicator Type | Description |
| --- | --- |
| Basic Software | The quantity of idle CPU usage. |
| Basic Software | The quantity of CPU usage used by kernel. |
| Basic Software | The quantity of CPU usage used by user processes. |
| Basic Software | The quantity of CPU usage used by processes waiting for input/output resources. |
| Basic Software | The quantity of CPU usage used to verify interrupts. |
| Basic Software | The quantity of available memory. |
| Basic Software | The quantity of memory in use. |
| Basic Software | The number of open sockets. |
| Middleware | The number of active threads. |
| Middleware | The number of running processes. |
| Middleware | The number of errors. |
| Middleware | The number of exceptions. |
| Application | The number of active network nodes on the network. |

TABLE 3-continued

| Network Node Operational Indicator Type | Description |
|---|---|
| Application | The number of inactive network nodes on the network. |
| Application | The total number of network nodes on the network. |

The real-time network monitor 202 includes several components to facilitate the monitoring of the network traffic indicators and network node operational indicators. In one implementation, the real-time network monitor 202 includes a measurement manager 204, a measurement ETL manager 206, and a monitored network traffic database 208. The measurement manager 204 may manage the measurement and monitoring of the network traffic indicators and the network node operational indicators. In addition, the measurement manager 204 may also handle communications and message passing with the event control layer 106. The measurement ETL manager 206 manages the manipulation of the network traffic indicator measurements and the network node operational indicator measurements. For example, the measurement ETL manager 206 may receive the indicator measurements from the network traffic probe 122 and the network node probe 124, transform the indicator measurements to fit within an expected format or other construct, and populate the monitored network traffic database 208 with the indicator measurements. Furthermore, the measurement ETL manager 206 may operate in conjunction with the measurement manager 204 to extract the indicator measurements from the monitored network traffic database 208 and communicate the indicator measurements to the event control layer 106.

The components of the monitoring layer 104 may be implemented in software, hardware, or a combination of hardware and software. For example, the components of the real-time network monitor 202, such as the measurement manager 204 and measurement ETL manager 206, may be implemented in software. In one implementation, the measurement manager 204 and the measurement ETL manager 206 are implemented as computer software daemons, including a poller daemon, a discovery daemon, a capture service daemon, and a collect daemon. However, alternative or additional daemons are also possible.

Each of the real-time network monitor daemons may be configured to perform one or more specific operations. For example, the poller daemon may be configured to verify the connection with the network nodes 114-116 using one or more network traffic protocols, such as Internet Control Message Protocol ("ICMP"), SNMP, or other network traffic protocols. As another example, the discovery daemon may be configured to discover new network nodes that have been added to the network. As yet another example, the capture service daemon may be configured to discover services exposed by the network nodes 114-116, discover services exposed by the probes 122-124, or other service discovery operations. The capture service daemon may be configured to discover the exposed services via a network traffic protocol, such as SNMP or other protocol. As a further example, the collect daemon may be configured to monitor the network traffic indicators and obtain network traffic indicator measurements. The collect daemon may also be configured to monitor network node operational indicators and obtain network node operational indicator measurements. With each real-time network monitor daemon configured to perform a specific operation, the monitoring layer 104 reduces the time it takes for the real-time network monitor 202 to obtain the network traffic indicator measurements and network node operational indicator measurements.

The real-time network monitor 202 stores the monitored network traffic indicator measurements and network node operational indicator measurements in a monitored network traffic database 208 in communication with the real-time network monitor 202. In one implementation, the measurement ETL manager 206 obtains the indicator measurements from the network traffic probes 122 and network node probes 124, and stores the indicator measurements in the monitored network traffic database 208.

As the network traffic indicator measurements and network node operational indicator measurements change over time due to fluctuations in input network traffic, output network traffic, and available network node system resources, the real-time network monitor 202 may be configured to store the indicator measurements in the monitored network traffic database 208 at predefined time intervals, such as every 5 milliseconds, every 10 seconds, or any other predefined time interval. By storing the indicator measurements at predefined time intervals, the real-time network monitor 202 ensures that the indicator measurements stored in the monitored network traffic database 208 are current indicator measurements. By having access to current indicator measurements, the network real-time monitoring and control system 102 can respond more readily to changes in the stability status of one or more network nodes 114-116.

To store the indicator measurements at predefined time intervals, the monitored network traffic database 208 may be implemented as a round-robin database. In general, a round-robin database describes a database in which time-series data is stored. Examples of time-series data includes data such as network bandwidth, temperatures, free CPU capacity, available program memory, and other data. A round-robin database may be configured to store the data in such a way that system storage footprint remains constant over time. A database configured as a round-robin database avoids resource expensive purge jobs and reduces complexity. An example of an available round-robin database is RRDtool, which is available from Oetiker+Partner AG, located in Olten, Switzerland. However, alternative databases may be used as the monitored network traffic database 208, such as a relational database, a hierarchical database, network-model database, or other type of database.

Figure 3:
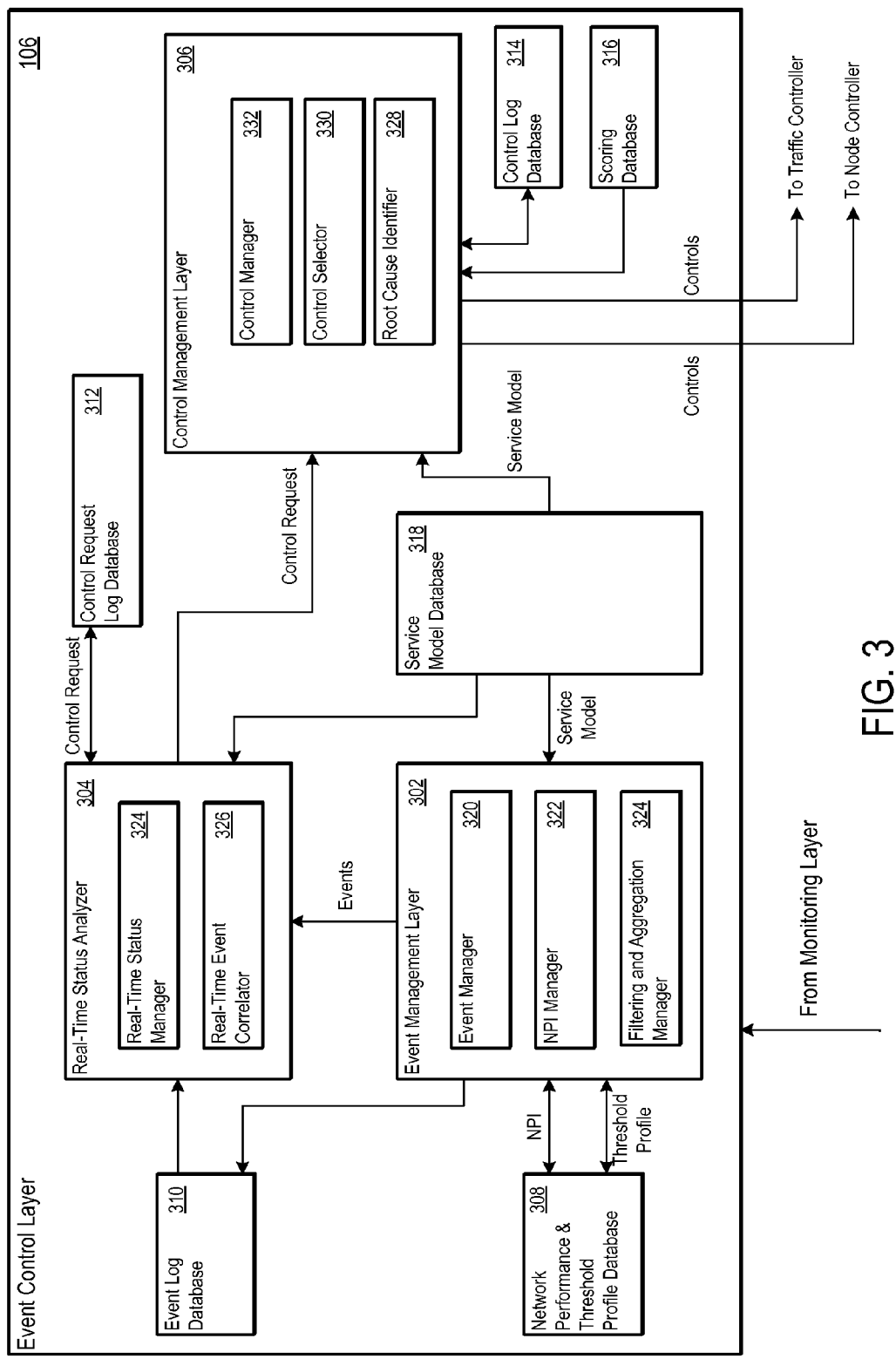
FIG. 3 shows one example of the event control layer of the network real-time monitoring and control system shown in FIG. 1.

FIG. 3 shows one example of the event control layer 106 of the network real-time monitoring and control system 102 shown in FIG. 1. The event control layer 106 may be implemented in computer hardware or software. One example of a computer software implementation of the event control layer 106 is OpenNMS, which is available from The OpenNMS Group, Inc., located in Pittsboro, N.C., United States.

The event control layer 106 may include several components and databases. In one implementation, the components of the event control layer 106 include an event management layer 302, a real-time status analyzer 304, and a control management layer 306. The databases of the event control layer 106 include a network performance and threshold profile database 308, an event log database 310, a control request log database, 312, a control log database 314, a scoring database 316, and a service model database 318. Other databases and components are also possible.

The databases 308-318 may be implemented as individual databases, as tables of a larger database, or in any other configuration of databases or as a single database. In one implementation, the databases 308-318 are implemented as a single object-relational database management system. An example of an object-relational database management system is PostgreSQL, which is available from the PostgreSQL Foundation located in Arlington, Va., United States. However, other implementations of the databases 308-318 are also possible.

The event manager layer 302 is configured to generate a network event identifier that identifies an event. The event manager layer 302 is also configured to manage network event identifiers generated by other layers of the real-time monitoring and control system 102. In general, an event may indicate an incidence or occurrence that has happened. In addition, events may relate to changes in the network traffic flows 118-120, changes in the network traffic indicators, changes in network nodes, 114-116, or other changes. The event manager layer 302 may communicate the generated network event identifier to one or more components of the network real-time monitoring and control system 102 to provide status information or status updates. Moreover, the components of the network real-time monitoring and control system 102 may react to the network event identifiers generated by the event manager layer 302. For example, a network event identifier may be used to initiate a network traffic shaping control, or, as discussed with reference to FIGS. 8-10, to change the state of a network traffic shaping control.

In one implementation, the event manager layer 302 includes an event manager 320, a Network Performance Indicator ("NPI") manager 322, and a filtering and aggregation manager 324 to facilitate the generation of network event identifiers. The components of the event manager layer 302 may be configured for specific operations. For example, the filtering and aggregation manager 324 may be configured to receive and filter network indicator measurements from the monitoring layer 104. Filtering the network indicator measurements from the monitoring layer 104 may ensure that the event manager 320 or NPI manager 322 receives relevant network traffic indicator measurements for generating network event identifiers, and that the event manager layer 302 is not overloaded with extraneous network traffic indicator measurements.

In one implementation, the filtering and aggregation manager 324 filters predetermined network traffic indicator measurements. For example, the filtering and aggregation manager 324 may be configured to filter network traffic indicator measurements associated with specific network traffic, such as network traffic indicator measurements for ARP network traffic. As another example, the filtering and aggregation manager 324 may be configured to filter network traffic indicator measurements associated with a specific network traffic indicator, such as SIP REGISTER messages for an SIP network traffic flow. The filtering and aggregation manager 324 may further be configured to filter network traffic indicator measurements associated with a network traffic flow or associated with a network node. However, the filtering and aggregation manager 324 may also be configured to receive any and all types of network traffic indicator measurements communicated by the monitoring layer 304.

The NPI manager 322 is configured to generate network performance measurements based on network performance equations and the network indicator measurements received from the monitoring layer 104. In general, a network performance measurement refers to a value that is derived from a network indicator measurement. In addition, a network performance measurement may be a time derivative measurement for a network indicator measurement. Alternatively, the network performance measurement may indicate a rate of change between network indicator measurements.

In one implementation, the NPI manager 322 is implemented as a computer software daemon, and generates the network performance measurements by receiving the network indicator measurements from the monitored network traffic database 208 and applying the network indicator measurements to a network performance equation retrieved from the network performance and threshold profile database 308. In another implementation, the filtering and aggregation manager 324 retrieves network indicator measurements from the monitored network traffic database 208 and communicates the retrieved network indicator measurements to the NPI manager 322. The NPI manager 322 may then execute the network performance equation to obtain a network performance measurement.

The NPI manager 322 may be configured to generate one or more types of network performance measurements. For example, the NPI manager 322 may generate network input performance measurements, network output performance measurements, network node performance measurements, or other network performance measurements. The NPI manger 322 may then store the generated network performance indicator in one or more of the databases 308-318. Alternatively, the NPI manager 322 may store the generate network performance indicator in a layer different than the event control layer 106. For example, in one implementation, the NPI manager 322 stores the network performance measurement in the monitored network traffic database 208 of the monitoring layer 104. In this implementation, the NPI manager 322 stores the network performance measurement in the monitored network traffic database 208 to ensure that the network performance measurement is the most current network performance measurement available to the network real-time monitoring and control system 102. The stored network performance measurement may then be retrievable by any of the components in the monitoring layer 104, the event control layer 106, traffic shaping control layer 108, or other layer.

The NPI manager 322 may generate network performance measurements that correspond to the received network indicator measurements. For example, the NPI manager 322 may generate network input performance measurements, network output performance measurements, network node performance measurements, or other network performance measurements. Network input performance measurements may be based on network traffic input indicator measurements. Exemplary network input performance measurements include a time derivative measurement of throughput of SIP INVITE messages incoming to a network node and a time derivative measurement of throughput of SIP REGISTER messages incoming to a network node. Similarly, network output performance measurements may be based on network traffic output indicator measurements. Exemplary network output performance measurements include a time derivative measurement of response time to answer SIP INVITE messages output from a network node and a time derivative measurement of response time to answer SIP REGISTER messages output from a network node. Likewise, network node performance measurements may be based on network node operational indicator measurements. Exemplary network node performance measurements include a CPU percentage usage amount that indicates the percentage of used CPU normalized for the number of processors in the network real-time monitoring and control system 102 and a memory percentage usage amount that indicates the percentage of memory used by the network real-time monitoring and control system 102. However, a network input performance measurement, a network output performance measurement, or a network node performance measurement may be based on any combination of network traffic input indicator measurements, network traffic output indicator measurements, and network node operational indicator measurements.

Similar to the network indicator measurements, the NPI manager 322 may generate the network performance measurements according to a predefined time interval. The predefined time interval for generating the network performance measurement may be the same as, or different than, the predefined time interval for generating the network indicator measurements. In addition, the predefined time interval for generating network performance measurements may be differentiated according to individual network performance measurements or network performance measurement type.

In addition, the network performance measurements may be differentiated according to a differentiating schema. For example, the network performance measurements may be differentiated according to network traffic flow, network node, or other differentiating schema.

In generating the network performance measurements, the NPI manager 322 may retrieve one or more network performance equations from the network performance and threshold profile database 308. Table 4 below shows an exemplary network performance and threshold profile database schema for defining network performance equations in the network performance and threshold profile database 308.

TABLE 4

| Column Name | Description |
|---|---|
| ID_INDICATOR | A unique indicator of the network performance indicator. |
| NAME | A mnemonic name of the network performance indicator. |
| DESCRIPTION | A brief description of the network performance measurement defined by the network performance equation. |
| ALAS_OPENNMS | An identifier used to reference the network performance equation. |
| TYPOLOGY | Describes the classification of the network performance measurement defined by the network performance equation. |
| FUNCTION | The network performance equation that defines the network performance measurement. |
| NETWORK_NODE | A unique identifier of the network node the to which the network performance indicator refers. |
| KPI_NODE | An identifier that identifiers the network node where the network performance indicator is measured. |
| ID_ANAG_INDICATORS | A reference to the type of indicators for the network performance indicator. |
| ENABLED | An identifier that indicates whether the network performance indicator is active and calculated from the system. |

A network performance and threshold profile database schema provides a flexible and convenient template for defining complex network performance equations that define network performance measurements. Table 5 shows one example of a network performance equation record that defines a network performance equation for determining a CPU percentage usage amount network node performance measurement.

TABLE 5

| Parameter Name | Description |
|---|---|
| ID_INDICATOR | 15 |
| NAME | SS_MIK05 |

TABLE 5-continued

| Parameter Name | Description |
|---|---|
| DESCRIPTION | Percentage Used CPU |
| ALIAS_OPENNMS | percentageUsedCPU |
| TYPOLOGY | NPI |
| FUNCTION | 100 − A29/round ((A29 + A36 + A43 + A50 + A57 + A64)/100, 3) |
| NETWORK_NODE | 20 |
| KPI_NODE | 20 |
| ID_ANAG_INDICATORS | 4 |
| ENABLED | TRUE |

Table 6 shows one example of a network performance equation record that defines a network performance equation for determining

TABLE 6

| Parameter Name | Description |
|---|---|
| ID_INDICATOR | 22 |
| NAME | SS_MIK012 |
| DESCRIPTION | Percentage of memory used by SIP SERVER |
| ALIAS_OPENNMS | percentUsedMem |
| TYPOLOGY | NPI |
| FUNCTION | 100 * (1 − (A73/A72)) |
| NETWORK_NODE | 20 |
| KPI_NODE | 37 |
| ID_ANAG_INDICATORS | 5 |
| ENABLED | TRUE |

The NPI manager 322 evaluates the network performance equation stored in the function field of the network performance record to generate the network performance measurement. In addition, the values in the function field of Tables 5-6 refer to other network indicator measurements and network performance measurements. Table 7 provides examples of the references referred by the function field of the network performance equation.

TABLE 7

| Function Field Parameter | Variable Name | Description |
|---|---|---|
| A26 | ssCPURawIdle | Number of CPU cycles while idle. |
| A36 | ssCPURawKernel | Number of CPU cycles used for the kernel. |
| A43 | ssCPURawSystem | Number of CPU cycles used for the system. |
| A50 | ssCPURawUser | Number of CPU cycles used to execute user program. |
| A57 | ssCPURawWait | Number of CPU cycles used while waiting for input/output resources. |
| A64 | ssCPURawNice | Number of CPU cycles used due to an interrupt. |
| A72 | N/A | Amount of available physical memory on a server in the sampling moment. |
| A73 | N/A | Amount of physical memory in server. |

The event manager 320 uses the network performance measurements and network indicator measurements to generate network event identifiers. The event manager 320 is also configured to handle the management of network event identifiers generated by other components of the network real-time monitoring and control system 102. The event manager 320 provides a centralized component for handling network event identifiers that may be generated by multiple components. Furthermore, the event manager 320 may be configured to communicate network event identifiers generated by a first component to a second component, where the second component relies on the network event identifier to perform a task or operation. Hence, as components are added to the network real-time monitoring and control system, added components may be configured to communicate with the event manager 320 or the event control layer 106 directly rather than having to be configured with every component in the network real-time monitoring and control system 102. With the event manager 320 configured to manage and log generated network event identifiers, the other components of the network real-time monitoring and control system 102 can be configured to perform operations without the complex overhead of being configured to manage network event identifiers or unknown future components that may be added later to the network real-time monitoring and control system 102.

The event manager 320 may be implemented as computer hardware, computer software, or both. In one implementation, the event manager 320 is implemented as computer software daemon written in the Java computer programming language. The event manager 320 may be configured to listen for data and notifications on a predefined TCP port and, in response to the received data and notifications from the predefined TCP port, generate network event identifiers that are communicated to one or more components of the event control layer 106. For example, the event manager 320 may communicate network event identifiers to the real-time status analyzer 304. As another example, the event manager 320 may communicate the network event identifiers to an event log database 310, which may then be accessed by other components of the event control layer 106.

The network indicator measurements and network performance measurements of the monitoring layer 104 are communicated to the event manager 320. In one implementation, the event manger 320 retrieves the network indicator measurements and network performance measurements from the monitored network traffic database 208. In another implementation, the filtering and aggregation manager 324 retrieves the network indicator measurements and network performance measurements from the monitored network traffic database 208, and communicates the network indicator measurements and network performance measurements to the event manager 320. The filtering and aggregation manager 324 may further filter the retrieved network indicator measurements and network performance measurements to communicate a predefined type of network indicator measurement and/or network performance measurement to the event manager 320. However, the event manager 320 may also access other databases to retrieve the network performance measurements and network indicator measurements, such as any of the databases 308-318.

In one implementation, the network performance and threshold profile database 308 may store a network performance threshold profile and a network indicator threshold profile. The network performance threshold profile may also be configured by a user or other system, such as through administrative layer 112. The network performance threshold profile may define network performance thresholds for one or more network performance measurements. For example, the network performance threshold profile may define network input performance thresholds for network input performance measurements, network output performance thresholds for network output performance measurements, and network node performance thresholds for network node performance measurements. Other network performance thresholds are also possible. Similarly, the network indicator threshold profile may define network indicator thresholds for one or more network indicator measurements. For example, the network indicator threshold profile may define network traffic input indicator thresholds for network traffic input indicator measurements, network traffic output indicator thresholds for network traffic output indicator measurements, and network node operational indicator thresholds for network node operational indicator measurements. Other types and combinations of network performance thresholds and network indicator thresholds are also possible. Furthermore, one or more network performance threshold profiles and one or more network indicator threshold profiles are also possible that define the network performance thresholds and network indicator thresholds, respectively.

In addition, the network performance threshold profile and the network indicator threshold profile may distinguish between different types of thresholds. For example, the profiles may define a warning threshold and a critical threshold. The warning threshold may be less than the critical threshold. The warning threshold may be a threshold where one or more network nodes are approaching an instability status. A critical threshold may be a threshold where one or more network nodes have reached an instability status. By defining and distinguishing warning thresholds and critical thresholds, the network real-time monitoring and control system 102 can attempt to prevent one or more network nodes 114-116 from reaching an instability status if a warning threshold has been reached. In other words, the warning thresholds may serve as a warning to the network real-time monitoring and control system 102 that one or more network nodes are about to become unstable.

The event manager 320 compares the network performance measurements and network indicator measurements with the network performance thresholds and network indicator thresholds, respectively, to generate network event identifiers. Network event identifiers may be implemented in a computer markup language, such as the Extensible Markup Language ("XML"). However, other computer languages that use a set of annotations to text that give instructions regarding the structure of text or how it is to be displayed may also be used.

The event manager 320 may be configured to generate a network event identifier based on a comparison of the network performance measurement with a network performance threshold, such as when the network performance measurement exceeds or falls below the network performance threshold. Similarly, the event manager 320 may be configured to generate a network event identifier based on a comparison of a network indicator measurement with a network indicator threshold, such as when a network indicator measurement exceeds or falls below a network indicator threshold. As one example, the event manager 320 may generate a network event identifier when a network traffic input indicator measurement, such as the number of SIP REGISTER messages received by a network node, exceeds a network traffic input indicator threshold, such as a total number of SIP REGISTER messages that can be received by the network node. As another example, the event manager 320 may generate a network event identifier when a network input performance measurement, such as the time derivative measurement of SIP REGISTER messages received by a network node, exceeds a network input performance threshold, such as the maximum rate at which the network node can receive SIP REGISTER messages.

Moreover, the event manager 320 may generate a network event identifier according to a combination of comparative measurements of network indicator thresholds and/or network performance thresholds. For example, the event manger

320 may generate a network event identifier when a first network input performance threshold is exceeded and a second network input performance threshold is exceeded. As another example, the event manager 320 may generate a network event identifier when a first network input performance threshold is exceeded and a first network node operational indicator threshold is exceeded. Other comparative combinations are also possible.

In general, the event manager 302 may be configured to generate any type of network event identifier. Table 8 below lists exemplary network event identifiers accompanied by corresponding descriptions.

TABLE 8

| Network event identifier | Description |
| --- | --- |
| EVENT_FINE_CONTR_OUT_SONDA | Identifies an event for automatically terminating a network traffic shaping control due to a network probe outage. |
| EVENT_FINE_CONTR_OUT_SONDA_KO | Identifies an event where the control logic associated with the network event identifier EVENT_FINE_CONTR_OUT_SONDA has raised an error. |
| EVENT_FINE_CONTR_OUT_SONDA_OK | Identifies an event where the control logic associated with the network event identifier EVENT_FINE_CONTR_OUT_SONDA has correctly executed. |
| EVENT_FINE_CONTR_RTC | Identifies an event where the network traffic shaping control should be terminated automatically. |
| EVENT_FINE_CONTR_RTC_KO | Identifies an event where the control logic associated with the network event identifier EVENT_FINE_CONTR_RTC has raised an error. |
| EVENT_FINE_CONTR_RTC_OK | Identifies an event where the control logic associated to the network event identifier EVENT_FINE_CONTR_RTC has correctly executed. |
| EVENT_FINE_CONTR_RTC_OUT_SONDA | Identifies an event where a network traffic shaping control should be automatically deleted due to an outage of a network probe. |
| EVENT_NODE_UP | Identifies an event where a network node is active and reachable. |
| EVENT_NODE_UP_KO | Identifies an event where the control logic associated with the network event identifier EVENT_NODE_UP has raised an error. |
| EVENT_NODE_UP_OK | Identifies an event where the control logic associated with the network event identifier EVENT_NODE_UP correctly executed. |
| EVENT_NOTIF_OUT_ISTANZA_SERVER | Identifies an event for an outage of a server instance that may be notified. |
| EVENT_NOTIF_OUT_SONDA | Identifies an event for an outage of the probes for notification. |
| EVENT_NOTIF_THR | Identifies an event for an exceeding/rearmed threshold for a particular indicator/NPI that may be notified. |
| EVENT_SUGG_CONTR | Identifies an event where a network traffic shaping control has been suggested. |
| EVENT_THR | Identifies an event for an exceeding/rearmed threshold for a particular indicator/NPI |
| EVENT_USR_ACC_CONTR | Identifies an event where a network traffic shaping control has been accepted. |
| EVENT_USR_ACC_CONTR_KO | Identifies an event where the control logic with the network event identifier EVENT_USR_ACC_CONTR has raised an error. |
| EVENT_USR_ACC_CONTR_OK | Identifies an event where the control logic associated with the network event identifier EVENT_USR_ACC_CONTR has been correctly executed. |
| EVENT_USR_ANN_CONTR | Identifies an event where a network traffic shaping control has been canceled. |
| EVENT_USR_TERM_CONTR | Identifies an event where a network traffic shaping control has been terminated. |

TABLE 8-continued

| Network event identifier | Description |
| --- | --- |
| EVENT_USR_TERM_CONTR_OK | Identifies an event where the control logic associated with the network event identifier EVENT_USR_TERM_CONTR has been correctly executed. |

The control logic referred to by Table 8 may be implemented by one or more of the components 302-306 of the event control layer 106. For example, the control logic may be implemented by the real-time status analyzer 304 and control management layer 306. Alternatively, the control logic may be implemented by the filtering and aggregation manager 324, the control selector 330, and the control manager 332. Alternative implementations of the control logic are also possible.

In addition to generating network event identifiers based on comparisons of network performance thresholds and network indicator thresholds, the event manager 320 may be configured to manage network event identifiers generated from other components of the real-time monitoring and control system 102, such as from the monitoring layer 104. For example, the event manager 302 may receive a network event identifier from the monitoring layer 104 regarding the status of a network node. The network event identifier may indicate that the network node is active and reachable. In this example, the event manager 302 may receive an EVENT_NODE_UP network event identifier. As another example, the event manager 302 may receive a network event identifier regarding the status of a network probe, such as the network traffic probe 122 or the network node probe 124. The network event identifier may indicate that the network probe has failed or has suffered an outage. Where the network probe has failed or has suffered an outage, the event manager 302 may receive an EVENT_FINE_CONTR_OUT_SONDA network event identifier. Other types of network event identifiers are also possible.

The event manager 302 may communicate the generated network event identifiers to the real-time status analyzer 304. The real-time status analyzer 304 handles the generation of requests for a network traffic shaping control. The real-time status analyzer 304 may be implemented in computer hardware or computer software. In one implementation, real-time status analyzer 304 is implemented as an event receiver queue, a computer software thread containing a network event identifier hash table, and a main control thread. The event receiver queue is configured to receive network event identifiers from the event manager 320 and distribute the network event identifiers to the real-time status manager 324 and the real-time event correlator 326. The event receiver queue may be implemented as a Java Message Service ("JMS") queue deployed in a JBoss application server. The JBoss application server is available from JBoss, which is a division of Red Hat, and located in Atlanta, Ga., United States. The computer software thread containing the network event identifier hash table contains hashes of all the events associated with a network node. The filtering and aggregation manager 324 and the real-time event correlator 326 may store network state identifiers in the hash table, and when a change in state is requested, the main control thread communicates requests for network traffic shaping controls to the control management layer 306. In one implementation, the real-time status manager 324 is the main control thread.

The real-time status analyzer 304 includes a real-time event manager 324 and the real-time event correlator 326. The real-time event correlator 326 correlates the network event identifier with a network node status identifier that identifies the status of the network node associated with the network event identifier. As a network event identifier may not specify the stability status of a network node, the configuration of the real-time event correlator 326 facilitates the identification of an instability status given a network event identifier. Moreover, as the correlation of a single network event identifier may not identify an instability status, the real-time event correlator 326 may be configured to correlate multiple network event identifiers with a single network node status identifier. Hence, as different network event identifiers are generated across the components of the network real-time monitoring and control system 102, the real-time event correlator 326 simplifies the task of identifying an instability status.

In one implementation, the real-time event correlator 326 interacts with the service model database 318 to correlate network event identifiers with a network node. The real-time correlator may be implemented as a messenger queue, such as a JMS queue, deployed on a JBoss application server and as a software thread that contains the status of a network node. Alternatively, or in addition, the real-time event correlator 326 may include a business rules engine or other software that executes rules to make decisions. The real-time event correlator 326 may further include facts and assertions for executing the rules, and the facts and assertions may comprise network event identifiers, network indicator measurements, network performance measurements, and other facts and assertions. The real-time event correlator 326 may receive one or more network event identifiers from one or more layers 104-112, such as the monitoring layer 104 or the event control layer 106, using the JMS queue, and then interacts with the service model database 318 based on the received network event identifier. The real-time event correlator 326 may also be implemented as part of a JMS queue controller and a Java class logic.

The real-time status manager 324 generates a request for a network traffic shaping control based on the correlation of the network event identifier with the network node status identifier. The real-time status analyzer 324 may also communicate one or more network event identifiers to the event manager 302 that identifies the actions taken by the real-time status analyzer 324.

The real-time event correlator 326 may correlate network event identifiers with a network node status identifier according to a predefined node status rule set. The real-time event correlator 326 receives network event identifiers and, based on the status of one or more indicators for a network node, identifies a potential beginning of network node instability. The real-time event correlator 326 may refer to the service model database 318 to correlate the network event identifier with the network node and with the real-time status manager 324.

FIG. 4 shows an example of a node status rule set 402. The network node status rule set 402 may be implemented in any number of computer hardware or computer software technologies. As one example, the network node status rule set 402 is implemented in Microsoft Excel, which is available from the Microsoft Corporation, located in Redmond, Wash., United States.

The node status rule set 402 may include node status rule components such as one or more of a network node status identifier 404, a network node status condition 406, a network node status condition priority 408, and a network node status scenario 410. Alternative node status rule components are also possible.

The network node status identifier 404 identifies an instability status of one or more of the network nodes 114-116. As shown in FIG. 4, the node status rule set 402 includes six network node status identifiers 404 labeled as R1, R2, R3, R4, R5, and R6 to identify status of a network node. The node status rule set 402 may be used to identify an instability status of any of the network nodes 114-116. A single node status rule set 402 may associated with all of the network nodes 114-116. Alternatively, each network node 114-116 may be associated with its own node status rule set 402. The node status rule set 402 may include alternative network node status identifiers than those shown in FIG. 4.

Each network node status identifiers 404 is associated with a network node status condition 406. A network node status condition 406 may be one or more conditions that are satisfied according to one or more network event identifiers. As a network node status condition 406 may be satisfied based on one or more network event identifiers, the network node status condition 406 provides a streamlined mechanism for evaluating complex and disparate network event identifiers.

Using a network event identifier, the real-time event correlator 326 attempts to evaluate and/or satisfy the network node status conditions 406. When a network node status condition 406 is satisfied, the associated network node status identifier 404 is identified. As a first example, where the network event identifier identifies that an input indicator threshold, such as an input SIP INVITE critical threshold, has been exceeded, the real-time event correlator 326 identifies that the network node status condition 406 associated with the node status identifier R1 has been satisfied. Hence, the real-time event correlator 326 correlates the network event identifier associated with an exceeded input SIP INVITE critical threshold with the network instability status identifier R1. As a second example, where a one or network event identifiers identify that one or more input indicator thresholds, such as an input SIP REGISTER warning threshold, have been exceeded and two or more network event identifiers identify that two or more network performance measurement warning thresholds have been exceeded, the real-time event correlator 326 identifies that the network node status condition 406 associated with the node status identifier R4 has been satisfied. Hence, in this second example, the real-time event correlator 326 correlates network event identifiers with the network instability status identifier R4.

The node status rule set 402 also includes a network node status condition priority 408. The network node status condition priority 408 indicates a priority level associated with a corresponding network node status condition 406. The network node status condition priority 408 may be different for each network node status conditions 406. Alternatively, two or more network node status conditions 406 may have the same network node status condition priority 408.

The real-time event correlator 326 may be configured to evaluate the network node status condition 406 according to its associated priority level identified by the network node status condition priority 408. For example, as shown in FIG. 4, the real-time event correlator 326 may evaluate the R2 network node status condition, which as the highest level priority, first; the R1 network node status condition second; the R6 network node status condition third; the R5 network node status condition fifth; and the R3 network node status condition, which has the lowest level priority, sixth. Because the network node status condition priorities 408 identify a priority level of the network node status conditions 406, the network node status condition priorities 408 establish a priority order in which network traffic shaping controls are applied to network traffic flows and/or network nodes. In some circumstances, there may be uncertainties as to which network traffic shaping control to apply first. Hence, the network node status priority 408 assists in the resolution of conflicts among simultaneously satisfied network node status conditions 408. In addition, the network node status condition priority 408 facilitates the evaluation of a network node status condition that may be considered more severe than other network node status conditions. Accordingly, the network real-time monitoring and control system 102 can take quicker action to implement a network traffic shaping control where a network node status condition with a high priority is satisfied by generated network node network event identifiers.

The node status rule set 402 may also include a node status scenario 410. In one implementation, the node status scenario 410 describes the system situation under which the network node status condition 406 has been satisfied. The node status scenario 410 may provide system information, network node information, network traffic flow information, or other information. Furthermore, the node status scenario 410 may be displayed on a graphical user interface or other output interface, such as a printer or audio speaker. For example, where the R2 network node status condition is satisfied, the real-time event correlator 326 may communicate the R2 node status scenario 410 to the reporting layer 110 for outputting to a display or other system or device.

Referring back to FIG. 3, when a network node status condition 406 is satisfied, the real-time event correlator 326 may communicate the network node status identifier to the real-time status manager 324. Alternatively, the real-time event correlator 326 may generate a network event identifier indicating the identified network node status identifier, and may communicate the generated network event identifier to the event manager 320 for further processing. Hence, the real-time status manager 324 may receive the network node status identifier via a component other than the real-time event correlator 326, such as the event manager 320.

Based on the correlation of the network event identifier with the network node status identifier, the real-time status manager 324 may generate a request for a network traffic shaping control. In one implementation, the real-time status manager 324 communicates the request for a network traffic shaping control to a control request log database 312. The request for the network traffic shaping control may be read from the control request log database 312 from one or more components, such as the control management layer 306. In another implementation, the real-time status manager 324 generates a network event identifier that contains a request for a network traffic shaping control and communicates the network event identifier to the event management layer 302. The network event identifier containing the request for the network traffic shaping control may then be stored on the monitored network traffic database 208 and retrievable by any of the components of the network real-time monitoring and control system 102.

The control management layer 306 may receive the request for a network traffic shaping control from the monitored network traffic database 208, the real-time status analyzer 304, or any other component of the network real-time monitoring and control system 102. In one implementation, the control management layer 306 is implemented as part of the JBoss application server, which is available from JBoss, a division of Red Hat. The control management layer 306 may define a main control node thread and a control management thread. The main control node thread may be configured to generate the network traffic shaping control. The main control node thread may then communicate the generated network traffic shaping control to the control management thread.

The control management thread manages network traffic shaping controls. Managing a network traffic shaping control may include sending a network event identifier to the event management layer 302 that notifies the event management layer 302 of the generated control, and managing the life cycle of the network traffic control as the network traffic control transitions between one or more states based on generated network event identifiers. Managing the network traffic shaping control may also include terminating the network traffic shaping control based on a predefined condition, such as when a network node becomes stable or when a received termination request to terminate the network traffic shaping control is received.

The control management layer 306 may include one or more components to facilitate the generation and management of network traffic shaping controls. In one implementation, the control management layer 306 includes a root cause identifier 328, a control selector 330, and a control manager 332. Alternative components are also possible.

The control manager 332 initially receives the request for the network traffic shaping control. Where the control manager 332 receives multiple requests for network traffic shaping controls, the control manager 332 communicates with the root cause identifier 328 to prioritize which network traffic flow is considered first.

In one implementation, the root cause identifier 328 assigns priority levels to one or more network traffic flows in deciding which network traffic flows should receive a network traffic shaping control. The root cause identifier 328 may communicate with a scoring database 316 to apply a network traffic scoring function to one or more of the input network traffic flows 118 to obtain a priority level for each corresponding input network traffic flow 118. In general, a network traffic scoring function is a function that identifies the network traffic flow priority for a corresponding network traffic flow. For example, the root cause identifier 328 may use one or more network traffic scoring functions to determine network traffic flow priorities among one or more input network traffic flows 118 or output network traffic flows 120.

As mentioned above, a network traffic flow priority identifies a network traffic flow priority level for a network traffic flow. The network traffic flow priority level assigned to a corresponding network traffic flow may determine whether a network traffic shaping control is applied to the corresponding network traffic flow. Each of the network traffic flows of the network nodes 114-116 may be assigned a network traffic flow priority. For example, when there are no indications on a network traffic flow to shape, the root cause identifier 328 may apply the network traffic scoring function to identify a candidate network traffic flow that has less impact on the overall service for one or more network nodes 114-116. Assigning a network traffic flow priority may be performed based on the service impact of the network traffic flow and the transactional computing weight.

The term "transaction computing weight" refers to the amount of computing resources required to process a transaction. Computing resources may include processor cycles, an amount of memory, available input or output devices, or any other type of computing resources. In one example, the network real-time monitoring and control system 102 may implement a first method and a second method. Furthermore, in this example, the first method may require at least three queries of one or more of the databases of the network real-time monitoring and control system 102, whereas the second method may require only one query. In this example, the transaction computing weight for the first method would be greater than the transaction computing weight of the second method, and the increased transaction computing weight may be taken into account when a network traffic shaping control is suggested.

In addition, the root cause identifier 328 may use a network traffic scoring function by to determine network traffic flow priorities. In one implementation, the network traffic scoring function may use the network node status condition priorities 408. The network traffic scoring function may be dependent on the transaction computing weight of one or more network traffic flows.

The root cause identifier may retain the network traffic flow priority level for a network traffic flow. In one implementation, the root cause identifier 328 stores the network traffic flow priority in the scoring database 316. However, the root cause identifier 328 may store the network traffic flow priority in another database, such as the monitored network traffic database 208.

The control selector 330 selects and/or generates the network traffic shaping control requested by the real-time status analyzer 304. The control selector 330 may be implemented as a business rules engine or other software system that executes one or more rules in a runtime production environment. One example of a business rules engine is JBoss Rules, which is available from JBoss, which is a division of Red Hat.

As previously discussed, a network traffic shaping control includes instructions and parameters to shape a network traffic flow. However, a network traffic shaping control may control additional actions other than network traffic shaping actions.

A network traffic shaping control may include one or more network traffic shaping control parameters that define the network traffic shaping control. The network traffic shaping control parameters define the actions to be taken when the network traffic shaping control is implemented. Examples of network traffic shaping control parameters that define a network traffic shaping control include an Internet traffic protocol, a message type, a source address, a destination address, and a network traffic shaping control intensity that identifies the amount of network traffic to be received by a network node. The network traffic shaping control intensity may identify an absolute value of the maximum allowed traffic, an absolute value of the minimum allowed traffic, or other value. Alternative parameters may also define a network traffic shaping control.

To populate the parameters of the network traffic shaping control, the control selector 330 may receive data from one or more databases of the network real-time monitoring and control system 102. For example, the control selector 330 may receive network indicator measurements and/or network performance measurements from the monitored network traffic database 208 to obtain current measurements relating to the operational conditions of one or more network nodes 114-116, the operational conditions of one or more network traffic flows, or a combination of measurements: The monitoring layer 104 may include a network communication interface based on an HTTP/XML protocol for receiving data from the monitored network traffic database 208.

In one implementation, the control selector 330 defines the network traffic shaping control intensity. An exemplary function that defines a network traffic shaping control intensity is listed below:

$$SCI = \frac{\text{Actual Measurement} - \text{Rearm Measurement}}{\text{Actual Measurement}} \times 100,$$

where:

SCI=the network traffic shaping control intensity;

Actual Measurement=the value of a network indicator measurement, network performance measurement, or other network measurement; and, Rearm Measurement=value of a critical or warning threshold associated with the actual measurement.

The network traffic shaping control intensity function shown above defines network traffic shaping intensity as a percentage of network traffic flow. For example, referring to FIG. 4, where the R1 network status condition is satisfied, the network traffic shaping control may define that the network traffic flow associated with the R1 status identifier is reduced by 33%, or that the network traffic flow associated with the R1 status identifier network traffic shaping control intensity is reduced to 33% of the normal network traffic flow. As another example, where the R1 network status condition is satisfied, the network traffic shaping control may define that the network traffic flow associated with the R1 status identifier is reduced by 50%, or that the network traffic flow associated with the R1 status identifier is reduced to 50% of the normal network traffic flow.

The variable values in the function defining a network traffic shaping control intensity, such as the "Actual Measurement" variable value and "Rearm Measurement" variable value, may be based on the network status identifier and/or the request for a network traffic shaping control from the real-time status analyzer 304. For example, the "Rearm Measurement" variable value may be based on a critical threshold or warning threshold associated with the network measurement used to calculate the network traffic shaping control intensity. Alternatively, one or more of the databases 308-318 may define the variables and/or variable values to use in defining the network traffic shaping control intensity.

The control selector 330 may then populate a primary network traffic shaping control record with the network traffic shaping control parameter values of the network traffic shaping control intensity. Table 9 below shows one example of network traffic shaping parameters that may define a primary network traffic shaping record.

TABLE 9

| Network Traffic Shaping Parameter | Description |
|---|---|
| ID_CONTROL | A parameter that identifies an identification number of the network traffic shaping control. |
| ID_ANAG_CONTROLLO | A parameter that identifiers the type of the network traffic shaping control. ID_ANAG_CONTROLLO may be used as a foreign key. |
| TIMESTAMP_ARRIVAL | A parameter that identifies the arrival time of the network traffic shaping control. |
| TIMESTAMP_BEGIN | A parameter that identifies the time when the network traffic shaping control begins execution. |

TABLE 9-continued

| Network Traffic Shaping Parameter | Description |
|---|---|
| TIMESTAMP_END | A parameter that identifies the time when the network traffic shaping control ends execution. |
| STATE | A parameter that identifies the state of the network traffic shaping control. |
| ID_NETWORK_NODE | A parameter that identifies the network node for the network traffic shaping control. |
| EVENTID | A parameter that identifies an event identification number for the network traffic shaping control. |
| XML_DATA | A parameter that contains network traffic shaping control data. The network traffic shaping control data may be stored in an XML format. |
| RIMODULATION | A parameter that identifies whether the network traffic shaping control is in modulation mode. In general, modulation mode indicates that once the control is started the intensity could be automatically adjusted depending on the new values of the measures of the indicators. |

The control selector 330 may also populate a network traffic shaping control intensity record with network traffic shaping control parameter values. Table 10 below shows one example of the parameters for a network traffic shaping control intensity record.

TABLE 10

| Network Traffic Shaping Parameter | Description |
|---|---|
| ID_DETTAGLIO_CONTROLLO | A parameter that identifies the secondary network traffic shaping control record. |
| ID_CONTROL | A parameter that identifies the primary network traffic shaping control record. |
| INTENSITY | A parameter that identifies the intensity of the network traffic shaping control. |
| ID_FLUSSO | A parameter that identifies the network traffic flow to which the network traffic shaping control should be applied. |

The primary network traffic shaping control record and the network traffic shaping control intensity record may be stored in one or more databases of the network real-time monitoring and control system 102. For example, the primary network traffic shaping control record and the network traffic shaping control intensity record may be stored in the service model database 318, the monitored network traffic database 208, or any of the other databases 308-318.

The control selector 330 may communicate the network traffic shaping control to the control manager 332 to notify the network real-time monitoring and control system 102 that a network traffic shaping control has been generated. In one implementation, the network traffic shaping control is sent as part of a network event identifier to the event manager 320. An example of an network event identifier that incorporates a network traffic shaping control is shown below as implemented in XML:

```
<?xml version="1.0" encoding="UTF-8"?>
<log xmlns="http://xmlns.opennms.org/xsd/event">
<events><event uuid="110">
<uei xmlns="">controller/sv_suggestControl</uei>
<source xmlns="">ruleEngine</source>
<time xmlns="">Wednesday, October 31, 2007 5:00:54 PM
CET</time>
<service xmlns="">ruleEngine</service>
<parms>
<parm>
<parmName xmlns="">idNetworkNode</parmName>
<value type="string" encoding="text">20<value>
</parm>
<parm>
<parmName xmlns="">RuleName</parmName>
<value type="string" encoding="text">R1</value>
</parm>
<parm>
<parmName xmlns="">RuleDescription</parmName>
<value type="string" encoding="text">Exceeding of a critical
threshold for one or more input indicators for SIP INVITE traffic
flows </value>
</parm>
<parm>
<parmName xmlns="">xmlState</parmName>
<value type="string" encoding="text"></value>
</parm>
<parm>
<parmName xmlns="">controlType</parmName>
<value type="string" encoding="text">P</value>
</parm>
<parm>
<parmName xmlns="">idAnagControllo</parmName>
<value type="string" encoding="text">2</value>
</parm>
<parm>
<parmName xmlns="">idIndicators</parmName>
<value type="string" encoding="text">2</value>
</parm>
<parm>
<parmName xmlns="">aliasIndicators</parmName>
<value type="string" encoding="text">inThrRegPisa</value>
</parm>
<parm>
<parmName xmlns="">idAnagFlusso</parmName>
<value type="string" encoding="text">2</value>
</parm>
<parm>
<parmName xmlns="">intensity</parmName>
<value type="string" encoding="text">33</value>
</parm>
<parm>
<parmName xmlns="">idFlows</parmName>
<value type="string" encoding="text">2</value>
</parm>
</parms>
</event></events>
</log>
```

In addition, the control manager 332 may maintain a log of the network traffic shaping controls that have been generated. In one implementation, a log of the network traffic shaping controls is maintained in the network traffic shaping control log database 314. In addition to the control manager 332, one or more components of the network real-time monitoring and control system 102 may have access to the network traffic shaping control log database 314.

After generating the network traffic shaping control, the control manager 332 may or may not automatically output the network traffic shaping control to the traffic shaping control layer 108. In one implementation, the output of the network traffic shaping control is controlled by a user of the network real-time monitoring and control system 102. In this implementation, a determined network traffic shaping control is a suggested network traffic shaping control because the user of the network real-time monitoring and control system 102 may have discretion as to whether the suggested network traffic shaping control is output to the traffic shaping control layer 108. For example, the control manager 332 may communicate a control acceptance request that requests acceptance of the suggested network traffic shaping control to the reporting layer 110, which, in turn, may be output to the user of the network real-time monitoring and control system 102. The control manager 332 may then hold the output of the suggested network traffic shaping control unit until the control manager 332 receives an acceptance acknowledgment of the suggested network traffic shaping control. Alternatively, the control manager 332 may terminate the suggested network traffic shaping control according to a predefined termination condition. For example, the control manager 332 may terminate the suggested network traffic shaping control when the control manager receives a decline acknowledgement. By giving the user discretion as to which network traffic shaping controls are output to the traffic shaping layer 108, the user may selectively apply the network traffic shaping controls that the user believes to be most desirable or beneficial for the network nodes 114-116.

In an alternative implementation, the acceptance and output of the network traffic shaping control is automatic. In this automatic implementation, when the network traffic shaping control is generated, the control manager 332 automatically outputs the network traffic shaping control to the traffic shaping control layer 108.

In addition, the life cycle of a network traffic shaping control may be controlled by the satisfaction of one or more conditions. For example, a network traffic shaping control may end when a terminating condition is satisfied. A terminating condition may be satisfied when a terminating request to terminate the network traffic shaping control is received from a user, or may be based on a network event identifier received by the control manager 332. Other conditions may include a finishing condition, a stopping condition, a failing condition, and an aborting condition. The conditions may be satisfied based on the occurrence of a network event identifier or the receipt of a user request.

As discussed below with reference to FIGS. 7-11, a network traffic shaping control may change to a state that ends the network traffic shaping control, and, by entering the state that ends the network traffic shaping, a condition controlling the life cycle of the network traffic shaping control may be satisfied.

In addition to the event management layer 302, the real-time analyzer 304, and control manager layer 306, the event control layer 106 may include a service model database 318 that stores a service model. In general, the service model provides a platform representation of a VoIP provider through the definition of its elements and their interconnections. In one implementation, the event management layer 302 communicates with the service model database 318 using Structured Query Language ("SQL") queries. The information retrieved from the service model database 318 facilitates the correlation of an event with one or more of the network nodes 114-116. The information retrieved from the service model database 318 may include relations between a network performance measurement, or other measurements and the server instance, and the relations between network nodes and server instances. In one implementation, the information retrieved from the service model database 318 occurs according to a predetermined service model condition, such as when the service model is first introduced to the network real-time monitoring and control system 102, when the service model database 318 has been modified, or other predetermined service model condition.

The real-time status analyzer 304 and the control management layer 306 may communicate with the service model database 318. For example, the real-time status manager 324 of the real-time status analyzer 304 may retrieve information the service model database 318 when a predetermined service model condition occurs or is satisfied. As another example, the root cause identifier 328 of the control management layer 306 may communicate with the service model database 318 to identify a root cause of the event and to identify one or more input traffic flows 118 or output traffic flows 120 to shape.

Other components of the network real-time monitoring and control system 102 may also communicate with the service model database 318. For example, the administrative layer 112 may communicate with the service model database 318. The administrative layer 112 may communicate with the service model database 318 for initial configuration of the service model or for later modifications of the service model database 318. Other interactions between the administrative layer 112 and the service model database 318 are also possible.

Figure 5:
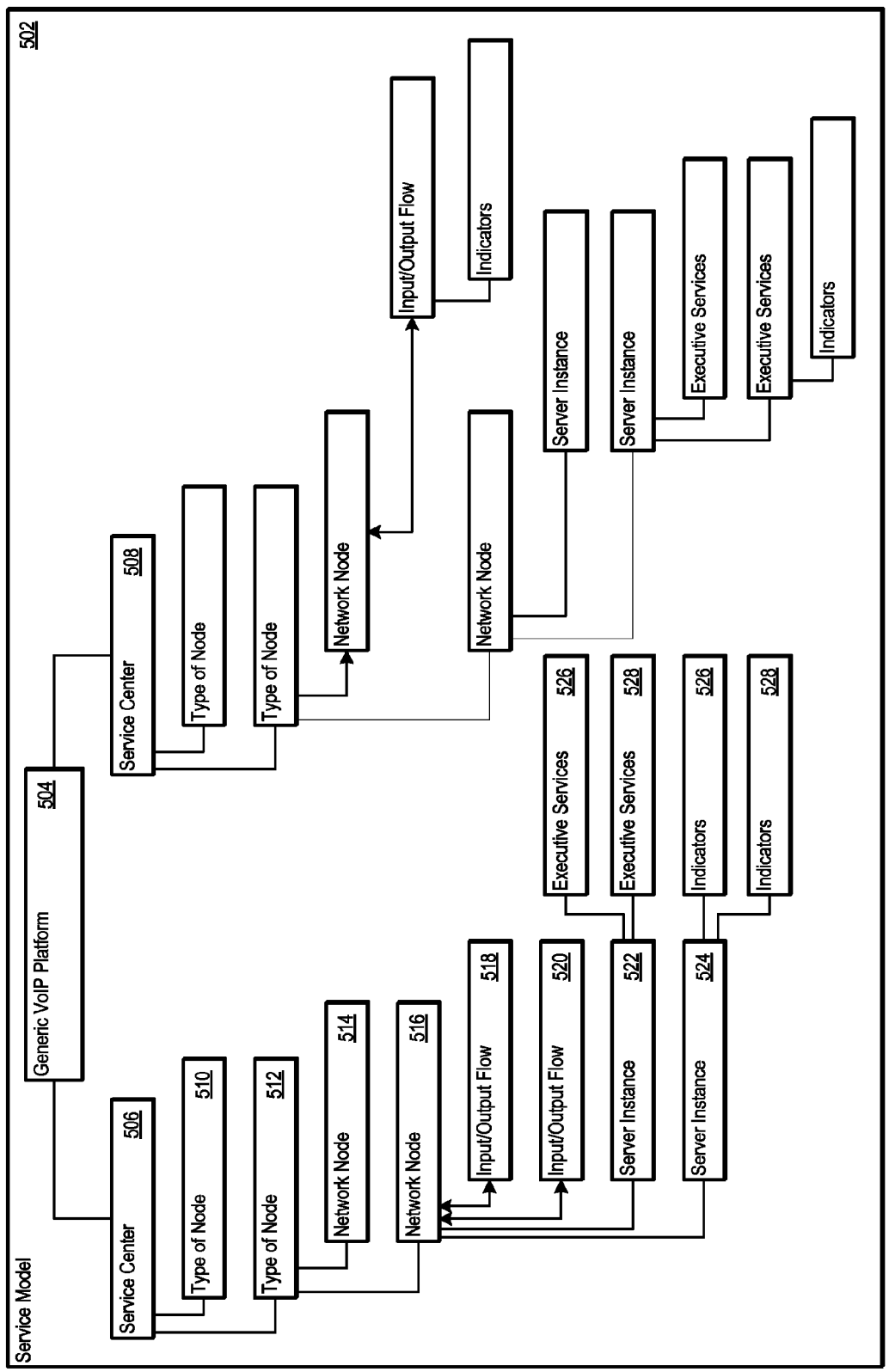
FIG. 5 shows one example of a service model used by the event control layer shown in FIG. 3.

FIG. 5 shows one example of a service model 502 stored in the service model database 318. The service model 502 includes a platform root node 504 that forms the root of the service model 502. The children and connectors of the platform root node 504 identify the network nodes, network servers, network node services, network traffic flows, and other entities that form the VoIP platform.

In the implementation shown in FIG. 5, the VoIP platform includes a first service center node 506 and a second service center node 508. The service center nodes 506-508 represent primary points of connection for network nodes. The service center nodes 506-508 may provide telecommunication services, such as VoIP service to one or more network nodes.

The network nodes of the service centers 506-508 are identified by node type. Examples of node types include an SIP server, a Home Subscriber Server ("HSS"), a softswitch, a media gateway, a session border controller, or other node types. However, the network nodes of the service center nodes 506-508 may be identified by other criteria, such as geographic location, telecommunication service provided, or other criteria. The first service center node 506 is identified as having two network node types, a first network node type 510 and a second node type 512. While the first network node type 510 does not have any children nodes, the second node type 512 is identified as having at least two network nodes The network node types 510-512 may or may not have network nodes as children nodes. Although the first network node type 510 does not have children nodes, the second network node type 512 is identified as having two children network nodes 514-516. The network nodes 514-516 may have similar children nodes. Children nodes of the network nodes 514-516 include server instances, network traffic flows, executive services and network node operational indicators. However, the children nodes of the network nodes 514-516 may include other types of children nodes, such as children nodes for network traffic indicator measurements, network traffic performance measurements, or other children nodes.

The second network node 516 is identified as having two network traffic flows 518-520. The network traffic flows 518-520 may be input network traffic flows, output network traffic flows, or a combination of network traffic flows. The second network node 516 is also identified as having a first server instance node 522 and a second server instance node 524. In general, a server instance node identifies a computer software application or other program running on a physical computer.

For example, an SIP server generally includes many different types of server instances, such as a load balancer, one or more servers installed in different server instances. A server instance node may identify the load balancer of the SIP server or one of the other server instances installed on the SIP server. A server instance node may also identify one or more server instances.

Like network nodes 514-516, a server instance node may have children nodes. Children nodes of service instance nodes 522-524 may include executive service nodes, indicator nodes, or other children nodes. In general, an executive service node identifies an executive service that may be integral to the service instance. Examples of executive services include operating systems, application server software, database software, or other executive service. As shown in FIG. 5, the first server instance node 522 has a first executive service node 526 and a second executive service node 528. Although the second server instance node 524 is not shown with executive service nodes, executive service nodes are possible for the second server instance node 524. Other configurations are also possible.

The second server instance node 524 includes a first set of indicators 526 and a second set of indicators 528. The indicators 526-528 identify network indicators for the second server instance node 524. The indicators 526-528 may identify network node operational measurements, network traffic indicator measurements, network traffic performance measurements, or other indicators.

Similar to the first server center node 506, the second service center node 508 may have children network node type nodes, children network node nodes, network traffic flow nodes, server instance nodes, indicator nodes, and other nodes. It is further possible that the children nodes of the second service node 508 are different than the first service center node 506. Other configurations of the service model 502, including additional or different service center nodes, are also possible.

Figure 6:
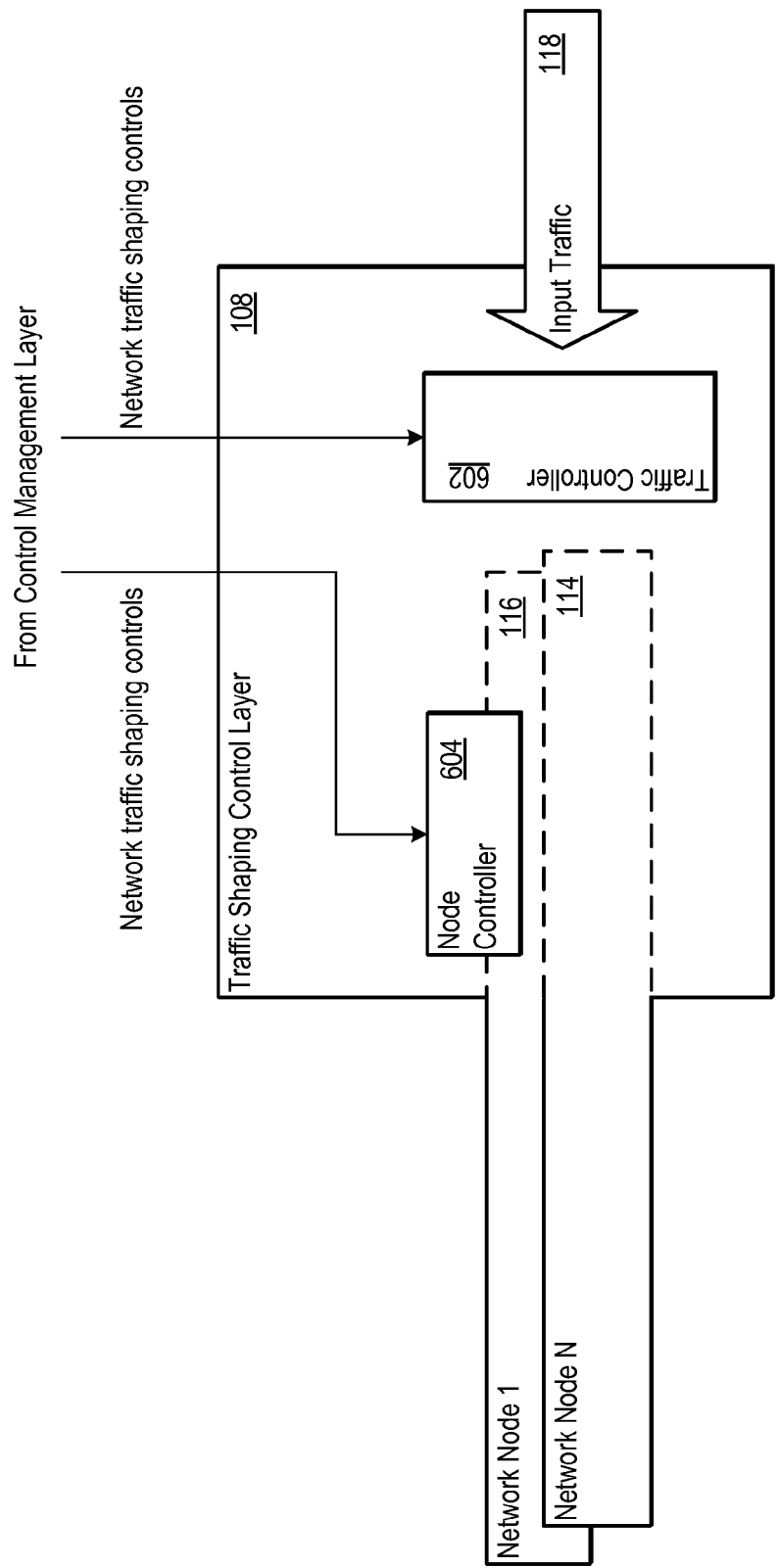
FIG. 6 shows one example of the traffic shaping control layer of the network real-time monitoring and control system shown in FIG. 1.

FIG. 6 is an example of the traffic shaping control layer 108 of the network real-time monitoring and control system 102. The traffic shaping control layer 108 is configured to receive a network traffic shaping control from the event control layer 106. As previously discussed, the traffic shaping control layer 108 may receive the network traffic shaping control when a user provides an acceptance acknowledgement of a suggest network traffic shaping control. Alternatively, the traffic shaping control layer 108 may receive the network traffic shaping control automatically after a network traffic shaping control is generated.

In one implementation, the traffic shaping controller layer 108 includes a traffic controller 602 and a network node controller 604. The traffic controller 602 and the network node controller 604 are configured to execute a network traffic shaping control to actively shape network traffic flows for one or more network nodes 114-116. For example, the traffic controller 602 and the network node controller 604 may be configured to execute a network traffic shaping control to actively shape input network traffic flows 118. However, the traffic controller 602 and the network node controller 604 may be configured to execute network traffic shaping controls to shape other network traffic flows, such as the output network traffic flow 120. The traffic controller 602 and node controller 604 may also provide responses to originating network nodes from where the network traffic flows originated. For example, the traffic controller 602 and node controller 604 may provide intelligent responses to the originating network nodes when a network traffic flow is shaped.

The traffic controller 602 and/or node controller 604 may be implemented in computer software or computer hardware. In one implementation, the traffic controller 602 and node controller 604 are implemented on a single network traffic shaping appliance that receives the network traffic shaping control from the control management layer 306. Alternatively, the traffic controller 602 and the node controller 604 may be implemented on two or more network traffic shaping appliances. An example of a network traffic shaping appliance that receives network traffic controls is the BIG-IP Application Delivery Controller, which is available from F5 Networks, Inc. located in Seattle, Wash., United States. In this implementation, the control management layer 306 communicates with the BIG-IP Application Delivery Controller using software designed to support interoperable machine-to-machine interaction over a network, such as XML and Simple Object Access Protocol ("SOAP"). The BIG-IP Application Delivery Controller may also be programmed using an internal scripting language, such as iRule, and a Service Oriented Architecture ("SOA") enabled Application Programming Interface ("API"), such as iControl. Both iRule and iControl are also available from F5 Networks, Inc.

Figure 7:
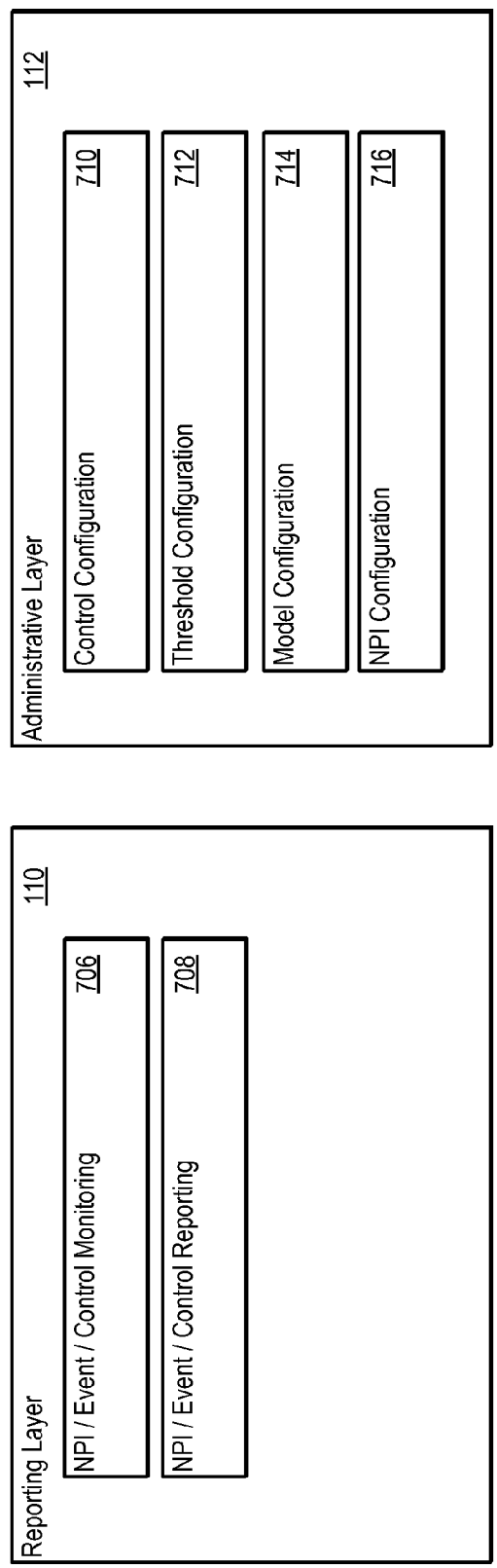
FIG. 7 shows one example of the reporting layer and the administrative layer of the network real-time monitoring and control system shown in FIG. 1.

FIG. 7 shows an example of the reporting layer 110 and the administrative layer 112 of the network real-time monitoring and control system shown in FIG. 1. The reporting layer 110 handles the reporting functions of the network real-time monitoring and control system 102. The administrative layer 112 handles the administrative functions of the network real-time monitoring and control system 102, such as displaying graphical user interfaces, receiving configuration information, displaying results from shaping one or more network traffic flows, and other administrative functions.

The reporting layer 110 and administrative layer 112 may be implemented in computer hardware or computer software. In one implementation, the reporting layer 110 and 112 are implemented as servlet containers, using such technologies as Apache Tomcat, which is available from the Apache Software Foundation, located in Forest Hill, Md., United States. The reporting layer 110 and administrative 112 may implement one or more web pages that are used to configure another technology used by the network real-time monitoring and control system 102, such as the OpenNMS system that may implement the monitoring layer 104 and the event control layer 106.

The reporting layer 110 may include one or more components for providing reporting information to another component, layer, system, user, or other entity. In one implementation, the reporting layer 110 includes a monitoring component 706 and a reporting component 708. The monitoring component 706 may monitor the data of the network real-time monitoring and control system 102, such as network traffic indicator measurements, network traffic performance measurements, network node operational indicator measurements, network traffic shaping controls, or other data. The reporting component 708 may generate reports for the data monitored by the monitoring component 706. The reporting layer 110 may communicate the monitored and reported data to the administrative layer 112 for output to a user via a graphical user interface or output to another system. Other types of output are also possible.

The administrative layer 112 may include one or more components for managing the configuration of the network real-time monitoring and control system 102. In one implementation, the administrative layer 112 includes a control configuration component 710, a threshold configuration component 712, a model configuration component 714, and an NPI configuration component 716. The control configuration component 710 may receive inputs that configure one or more network traffic shaping controls or configures the parameter values for generating a network traffic shaping control. For example, the control configuration component 710 may be used by a user to control the lifecycle management of a network traffic shaping control. A user may also use the control configuration component 710 to accept or reject a suggested network traffic shaping control suggested by the control manager 332.

The threshold configuration component 712 may receive inputs that configure one or more thresholds, such as a warning threshold and a critical threshold, for one or more indicators monitored by the network real-time monitoring and control system 102. For example, the threshold configuration 712 may receive inputs that configure network indicator warning thresholds, network performance warning thresholds, network indicator critical thresholds, network performance warning thresholds, or any other threshold implemented by the network real-time monitoring and control system 102.

The model configuration component 714 may receive inputs that configure the service model 502 stored in the service model database 318. The NPI configuration component 716 may receive inputs that configure the determination of network performance measurements, network indicator measurements, or any other measurement determined by the network real-time monitoring and control system 102.

Although the components 710-716 have been discussed with reference to receiving input data, the components 710-716 may also be configured for outputting data, such as the warning thresholds, the critical thresholds, the service model, the network traffic shaping controls, or other data. As mentioned previously, outputting data may include the display of data, the transmission of data, such as to another system, the storage of data, or any other type of output now known or later developed.

Figure 8:
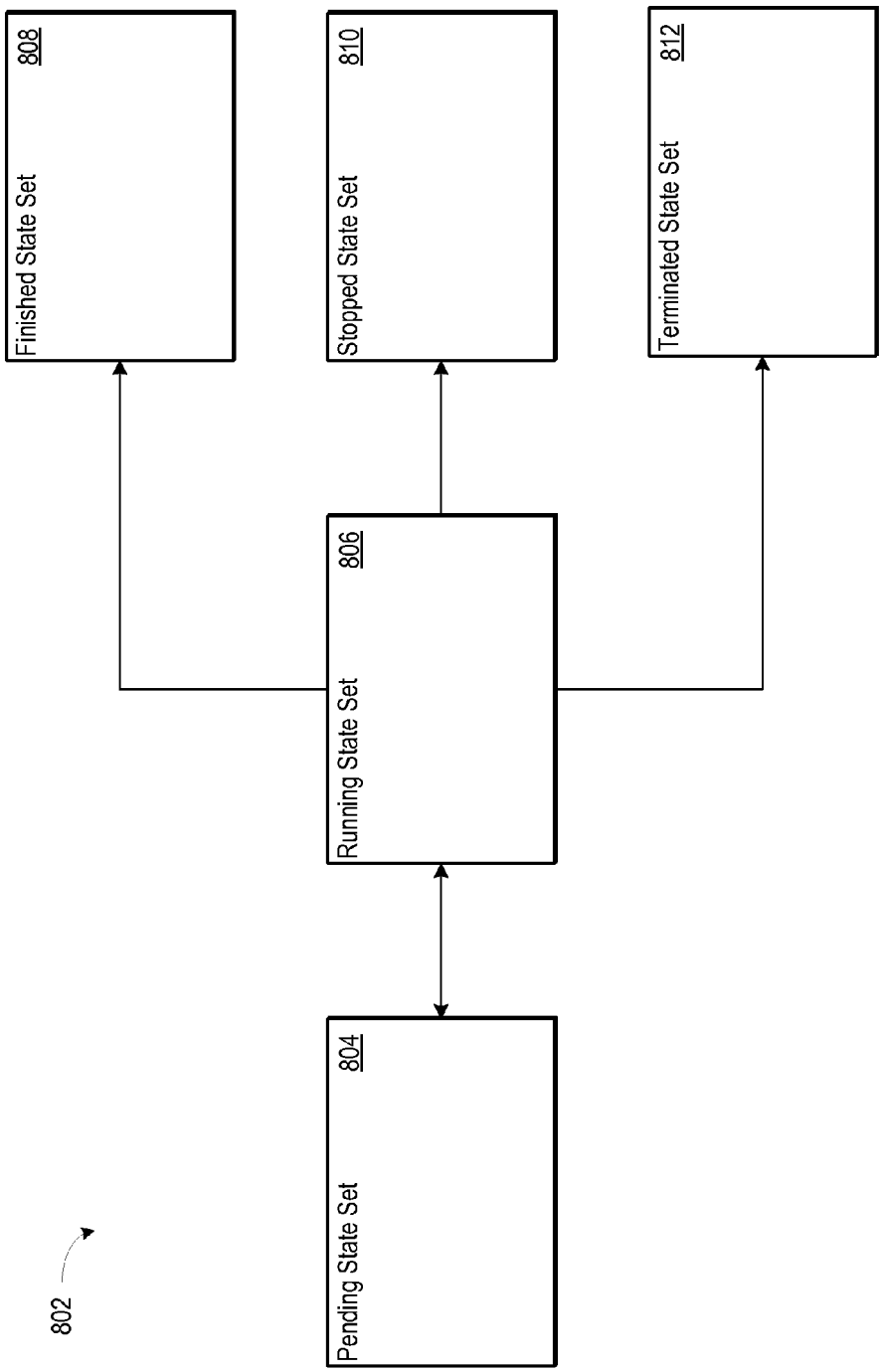
FIG. 8 shows one example of a network traffic shaping control state model.

FIG. 8 shows an example of a network traffic shaping control state model 802. The network traffic shaping control state model 802 defines the life cycle of a network traffic shaping control. The network traffic shaping control sate model 802 may include one or more states, and the network traffic shaping control may transition between these states according to a network event identifier. The network traffic shaping control may start at an initial state and transition between various states as network event identifiers are generated until the network traffic shaping control reaches an ending state that ends the network traffic shaping control.

The network traffic shaping control state model 802 provides a flexible model for both automatically and manually managing network traffic shaping controls. As a network traffic shaping control may be automatically suggested, manually suggested, automatically accepted, or manually accepted, the network traffic shaping control model 802 implements several states that account for the varying conditions under which a network traffic shaping control may be suggested or accepted. Moreover, the network traffic shaping control model 802 includes states that account for a potential failure in executing a control command that is issued to control one or more network traffic shaping controls.

In one implementation, the network traffic shaping control state model 802 includes five sets of states. The five sets of states include a set of pending states 804, a set of running states 806, a set of finished states 808, a set of stopped states 810, and a set of terminated states 812. However, alternative state sets are also possible.

The network traffic shaping control state model 802 facilitates distinguishing the different causes for terminating or ending a network traffic shaping control through the various state sets 808-812. For example, the network traffic shaping control state model 802 includes state sets 808-812 that identify the different causes for the ending of a network traffic shaping control. Exemplary causes for ending a network traffic shaping control include manual termination by a user or operator, which may be identified by the terminated state sets 812, automatic termination by the network real-time monitoring and control system 102, which may be identified by the finished state set 808, or the identification that one or more network nodes 114-116 have stopped responding, which may be identified by the stooped state set 810. Other causes for ending a network traffic shaping control, such as a communication failure in one or more layers of the real-time monitoring and control system 102 or a failure in the node controller 604 or the traffic controller 602, are also possible.

In one implementation, the network traffic shaping control state model 802 may be event driven so that implementing logic is based on events and a current state, such as using a finite state machine ("FSM") paradigm. Moreover, the network traffic shaping control state mode 802 is flexible and extensible to include other states and/or events, and may be used in other contexts outside of VoIP. Alternatively, the network traffic shaping control state model 802 may be implemented using a business process management ("BPM")

Each of the state sets 804-812 generally include states that identify the general status of a network traffic shaping control. For example, the set of pending states 804 generally includes states in which a network traffic shaping control is pending execution by the traffic controller 602 or the node controller 604. Similarly, the set of running states 806 generally include states in which the network traffic shaping control is being executed or transitioning to execution by the traffic controller 602 or the node controller 604. In addition, the set of finished states 808 generally includes states in which the network traffic shaping control has finished or transitioning to a finishing state by the traffic controller 602 or the node controller 604 according to a finishing condition. Furthermore, the set of stopped states 810 generally includes states in which the network traffic shaping control has stopped or is transitioning to a stopped state by the traffic controller 602 or the node controller 604. Finally, the set of terminated states 812 generally includes states in which the network traffic shaping has terminated or will be terminated by the traffic controller 602 or the node controller 604. However, each of the state sets 804-812 may also include alternative or different types of states.

In the example below, the network traffic shaping control has sixteen possible states. However, other implementations may employ more or fewer states. The different states may have a state type that defines whether the network traffic shaping control is in an initial state, an intermediary state, or an ending state. In general, an initial state is a state the network traffic shaping control is first assigned when instantiated. An intermediary state is a state reachable from the initial state but it is not a final state of the network traffic shaping control. An intermediary state may transition to another intermediary state or an ending state. An ending state is reachable from the pending state and the intermediary state, but, in general, is a state that does not transition to another state.

Table 11 below provides an exemplary list of states. Table 11 lists the state, the state set in which the state has been grouped, the state type, and a brief description of the state. However, alternative states than those shown in Table 11 are also possible.

TABLE 11

| State | State Set | State Type | Description |
|---|---|---|---|
| Aborted | Pending States | Final State | A state that indicates that the network traffic shaping control has been aborted based on the satisfaction of an aborting condition. |
| Pending | Pending States | Initial State | A state that indicates that the network traffic shaping control has been suggested and is pending execution. When instantiated, a network traffic shaping control may first be assigned a pending state. |
| Deleted | Pending States | Final State | A state that indicates that the network traffic shaping control has been automatically deleted before being accepted. |
| Discarded | Pending States | Final State | A state that indicates that the network traffic shaping control has been discarded since a newer network traffic shaping control has been suggested. |
| Wait Running | Running States | Intermediary State | A state that indicates that a run control command has been issued to execute the network traffic shaping control, but the run control command has not yet been acknowledged. |
| Running | Running States | Final State | A state that indicates that the network traffic shaping control is being executed by a network traffic shaping-appliance. |

TABLE 11-continued

| State | State Set | State Type | Description |
|---|---|---|---|
| Failed Running | Running States | Intermediary State | A state that indicates that the network traffic control has failed due to the occurrence of a failing condition. |
| Wait Finished | Finished States | Intermediary State | A state that indicates that a finish control command has been issued to finish the network traffic shaping control, but the finish control command has not yet been acknowledged. |
| Finished | Finished States | Final State | A state that indicates that the network traffic shaping control has finished according the satisfaction of a finishing condition. |
| Failed Finished | Finished States | Intermediary State | A state that identifies that the network traffic shaping control has been unable to reach the finished state due to the occurrence of a failing condition. |
| Wait Stopped | Stopped States | Intermediary State | A state that indicates that a stop control command has been issued to stop the network traffic shaping control, but the stop control command has not yet been acknowledged. |
| Stopped | Stopped States | Final State | A state that identifies that the network traffic shaping control has stopped according to the satisfaction of a stopping condition. |
| Failed Stopped | Stopped States | Intermediary State | A state that identifies that the network traffic shaping control has been unable to reach the stopped state due to the satisfaction of a failing condition. |
| Wait Terminated | Terminated States | Intermediary State | A state that indicates that a terminate control command has been issued to terminate the network traffic shaping control, but the terminate control command has not yet been acknowledged. |
| Terminated | Terminated States | Final State | A state that identifies that the network traffic shaping control has terminated according to the satisfaction of a terminating condition. |
| Failed Terminated | Terminated States | Intermediary State | A state that identifies that the network traffic shaping control has been unable to reach the terminated state due to the satisfaction of a failing condition. |

As shown in Table 11, one or more of the states may be reached according to the satisfaction of a condition. As previously discussed, conditions may include an aborting condition, terminating conditions, stopped conditions, failing conditions, and finished conditions. The conditions may be defined by whether one or more particular network event identifiers have been generated. Accordingly, the conditions may be satisfied according to the generation of the network event identifier. However, the conditions may also be satisfied by another event, such as the receipt of a request by the user to perform an action, or other event.

Figure 9:
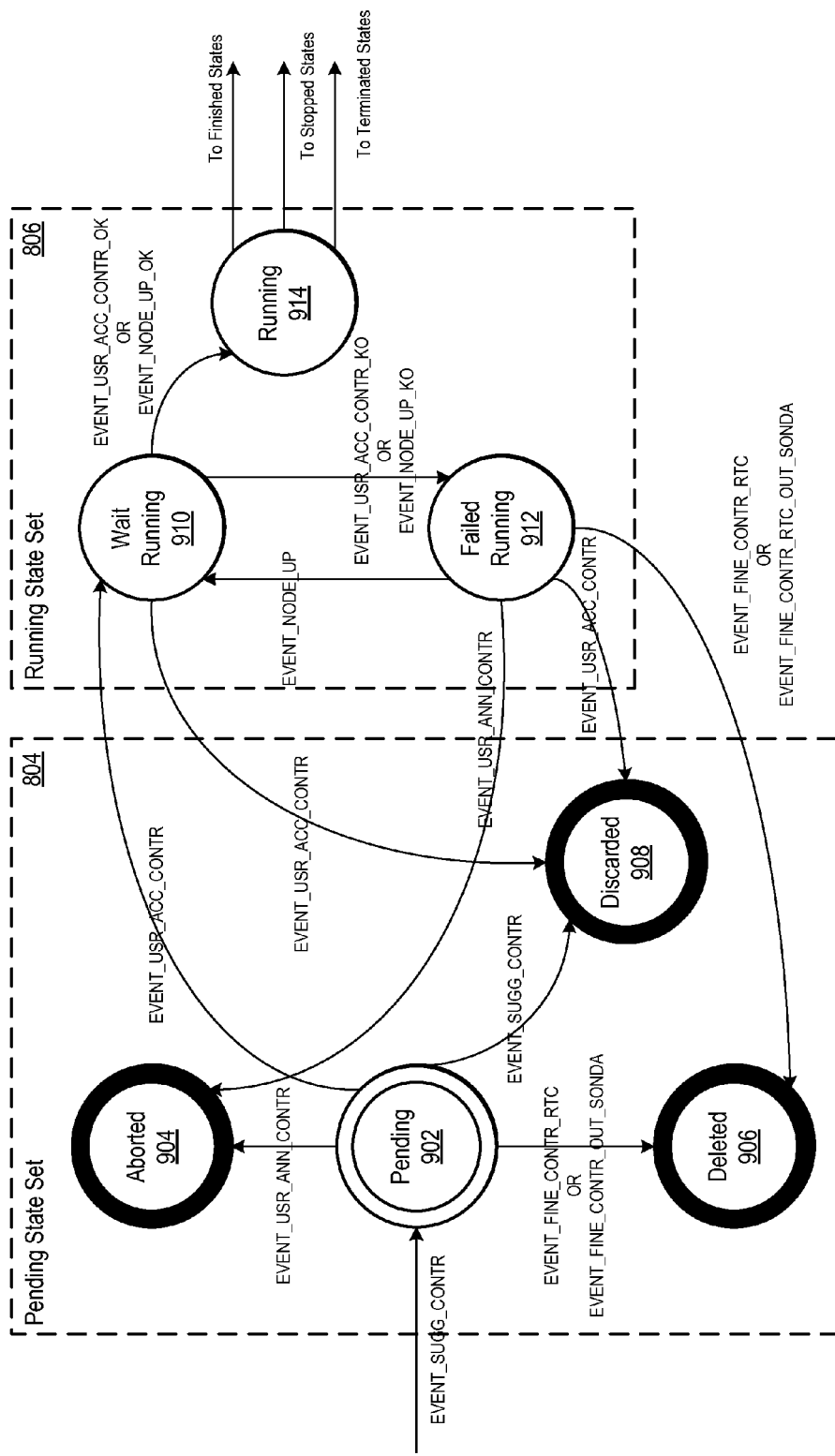
FIG. 9 shows one example of a pending state set and a running state set for the network traffic shaping control state model in FIG. 8.

FIG. 9 shows one example of the pending state set 804 and the running state set 806. In one implementation, the pending state set 804 includes a pending state 902, an aborted state 904, a discarded state 908, and a deleted state 906. The pending state 902 is an initial state that occurs when a network event identifier EVENT_SUGG_CONTR is generated. The EVENT_SUGG_CONTR network event identifier identifies that a network traffic shaping control has been generated and has been suggested. The network traffic shaping control may then transition to one or more of the states within the pending state set 804 according to the satisfaction of a condition, such as an aborting condition, or the occurrence of an event. Other conditions are also possible.

For transitioning between states 902-908 within the pending state set 804, the pending state set 804 may include one or more intra-pending state transitions, such as an intra-pending state transition between the pending state 902 and the aborted state 904. In addition, the network traffic shaping control may transition out of the pending state set 804 from the pending state 902 according to a pending state transition established between the pending state 902 and a wait running state 910.

The network traffic shaping control may transition from the pending state 902 to the wait running state 910 when the network traffic shaping control has been accepted, such as being accepted by a user, by another system, or by automatic acceptance. Table 12 below lists state transitions established between originating states and destination states including: the originating state, the state transition type, the condition type that causes the state transition, the network event identifier that satisfies the condition that causes the network traffic shaping control to undergo the state transition, and the destination state.

TABLE 12

| Originating State | Transition Type | Condition Type | Network event identifier | Destination State |
|---|---|---|---|---|
| Pending | Intra-pending | Aborting | EVENT_USR_ANN_CONTR | Aborted |
| Pending | Intra-pending | Deleting | EVENT_FINE_CONTR_RTC or EVENT_FINE_CONTR_OUT_SONDA | Deleted |
| Pending | Intra-pending | Discarded | EVENT_SUGG_CONTR | Discarded |
| Pending | Pending | Accepting | EVENT_USR_ACC_CONTR | Wait Running |

In one implementation, the running state set 806 includes a wait running state 910, a failed running state 912, and a running state 914. The network traffic shaping control enters the running state set 806 when the network traffic shaping control is assigned the wait running state 910. After the network traffic shaping control is assigned the wait running state 910, the network traffic shaping control may then transition to one or more of the states within the pending state set 804 according to the satisfaction of a running condition, such as when the network traffic shaping control has been accepted but not yet executed by the traffic controller 602 or the node controller 604. Other types of running conditions are also possible.

For transitioning between states 910-914 within the running state set 806, the running state set 806 may include one or more intra-running state transitions, such as an intra-running state transition between the wait running state 910 and the failed running state 912. In addition, the network traffic shaping control may transition out of the running state set 806 from the wait running state 910 or the running state 914 according to a running state transition. A first running state transition may be established between the wait running state 910 and the discarded state 908, and a second running state transition may be established between the running state 914 and to a state selected from the group comprising a finished state, a terminated state, and a stopped state. The network traffic shaping control may transition from the running state 914 to another state set when the network traffic shaping control has been executed. Table 13 below lists state transitions established in the running state set 806 and between originating states and destination states. Table 13 also lists the state transition type, the condition type that causes the transition, and the network event identifier that satisfies the condition that causes the network traffic shaping control to undergo the transition.

TABLE 13

| Originating State | Transition Type | Condition Type | Network event identifier | Destination State |
|---|---|---|---|---|
| Wait Running | Running | Discarding | EVENT_USR_ACC_CONTR | Discarded |
| Wait Running | Intra-running | Failing | EVENT_USR_ACC_CONTR_KO or EVENT_NODE_UP_KO | Failed Running |
| Wait Running | Intra-running | Running | EVENT_USR_ACC_CONTR_OK or EVENT_NODE_UP_OK | Running |
| Failed Running | Intra-pending | Running | EVENT_NODE_UP | Wait Running |
| Failed Running | Running | Aborting | EVENT_USR_ANN_CONTR | Aborted |
| Failed Running | Running | Discarding | EVENT_USR_ACC_CONTR | Discarded |
| Failed Running | Running | Deleting | EVENT_FINE_CONTR_RTC or EVENT_FINE_CONTR_RTC_OUT_SONDA | Deleted |

Figure 10:
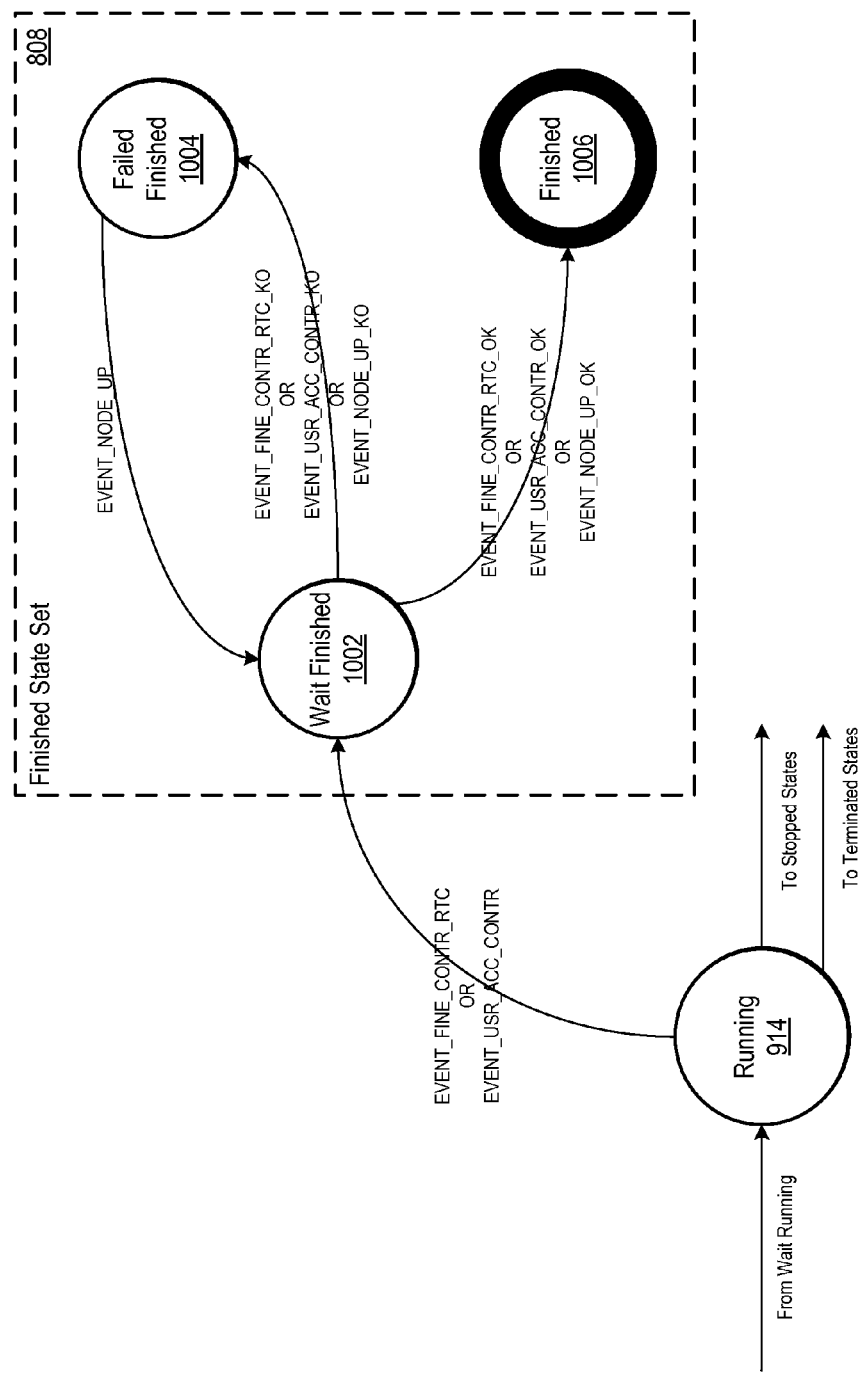
FIG. 10 shows one example of a finished state set for the network traffic shaping control state model in FIG. 8.

FIG. 10 shows one example of a finished state set 808 for the network traffic shaping control state model 802. In one implementation, the finished state set 808 includes a wait finished state 1002, a failed finished state 1004, and a finished state 1006. The network traffic shaping control enters the finished state set 808 when the network traffic shaping control is assigned the wait finished state 1002. After the network traffic shaping control is assigned the wait finished state 1002, the network traffic shaping control may then transition to one or more of the states within the finished state set 808 according to the satisfaction of a finishing condition, such as when the network real-time monitoring and control system 102 determines that the network traffic shaping control is no longer needed. A finishing condition may also include that one or more network performance measurement values have fallen below a threshold, such as a network performance threshold. Other finishing conditions are also possible.

For transitioning between states 1002-1006 within the finished state set 808, the finished state set 808 may establish one or more intra-finished state transitions, such as an intra-finished state transition between the wait finished state 1002 and the failed finished state 1004. Table 14 below lists state transitions established between originating states and destination states of the finished state set 808 including: the originating state, the state transition type, the condition type that causes the transition, the network event identifier that satisfies the condition that causes the network traffic shaping control to undergo the transition, and the destination state. Table 14 also lists the transition established between the running state 914 and the wait finished state 1002.

TABLE 14

| Originating State | Transition Type | Condition Type | Network event identifier | Destination State |
|---|---|---|---|---|
| Running | Running | Waiting | EVENT_FINE_CONTR_RTC or EVENT_USR_ACC_CONTR | Wait Finished |
| Wait Finished | Intra-finished | Failing | EVENT_FINE_CONTR_RTC_KO or EVENT_USR_ACC_CONTR_KO or EVENT_NODE_UP_KO | Failed Finished |
| Wait Finished | Intra-finished | Finishing | EVENT_FINE_CONTR_RTC_OK or EVENT_USR_ACC_CONTR_OK or EVENT_NODE_UP_OK | Finished |
| Failed Finished | Intra-finished | Waiting | EVENT_NODE_UP | Wait Finished | has stopped responding, or the satisfaction of a failing condition. Other conditions are also possible.

For transitioning between states 1102-1106 within the stopped state set 810, the stopped state set 810 may include one or more intra-stopped state transitions, such as an intra-stopped state transition between the wait stopped state 1102 and the failed stopped state 1104. Table 15 below lists state transitions established between originating states and destination states of the stopped state set 810 including: the originating state, the state transition type, the condition type that causes the transition, the network event identifier that satisfies the condition that causes the network traffic shaping control to undergo the transition, and the destination state. Table 15 also lists the transition established between the running state 914 and the wait stopped state 1102.

TABLE 15

| Originating State | Transition Type | Condition Type | Network event identifier | Destination State |
|---|---|---|---|---|
| Running | Running | Waiting | EVENT_FINE_CONTR_RTC_OUT_SONDA | Wait Stopped |
| Wait Stopped | Intra-stopped | Failing | EVENT_FINE_CONTR_OUT_SONDA_KO or EVENT_NODE_UP_KO | Failed Stopped |
| Wait Stopped | Intra-stopped | Stopping | EVENT_FINE_CONTR_OUT_SONDA_OK or EVENT_NODE_UP_OK | Stopped |
| Failed Stopped | Intra-stopped | Waiting | EVENT_NODE_UP | Wait Stopped |

Figure 11:
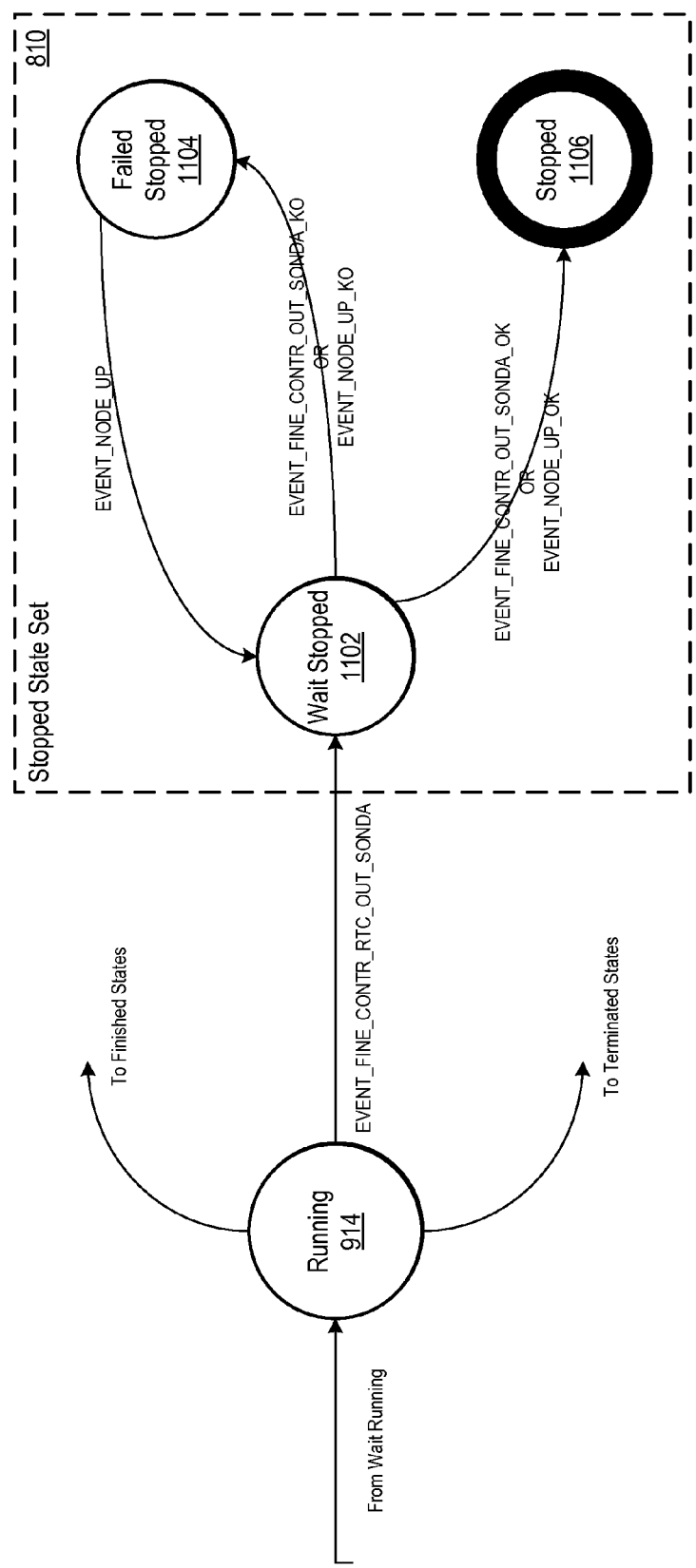
FIG. 11 shows one example of a stopped state set for the network traffic shaping control state model in FIG. 8.

FIG. 11 shows one example of a stopped state set 810 for the network traffic shaping control state model 802. In one implementation, the stopped state set 810 includes a wait stopped state 1102, a failed stopped state 1104, and a stopped state 1106. The network traffic shaping control enters the stopped state set 810 when the network traffic shaping control is assigned the wait stopped state 1102. After the network traffic shaping control is assigned the wait stopped state 1102, the network traffic shaping control may then transition to one or more of the states within the stopped state set 810 according to the satisfaction of a stopping condition, such as when the network real-time monitoring and control system 102 determines that one or more of the network nodes 114-116

Figure 12:
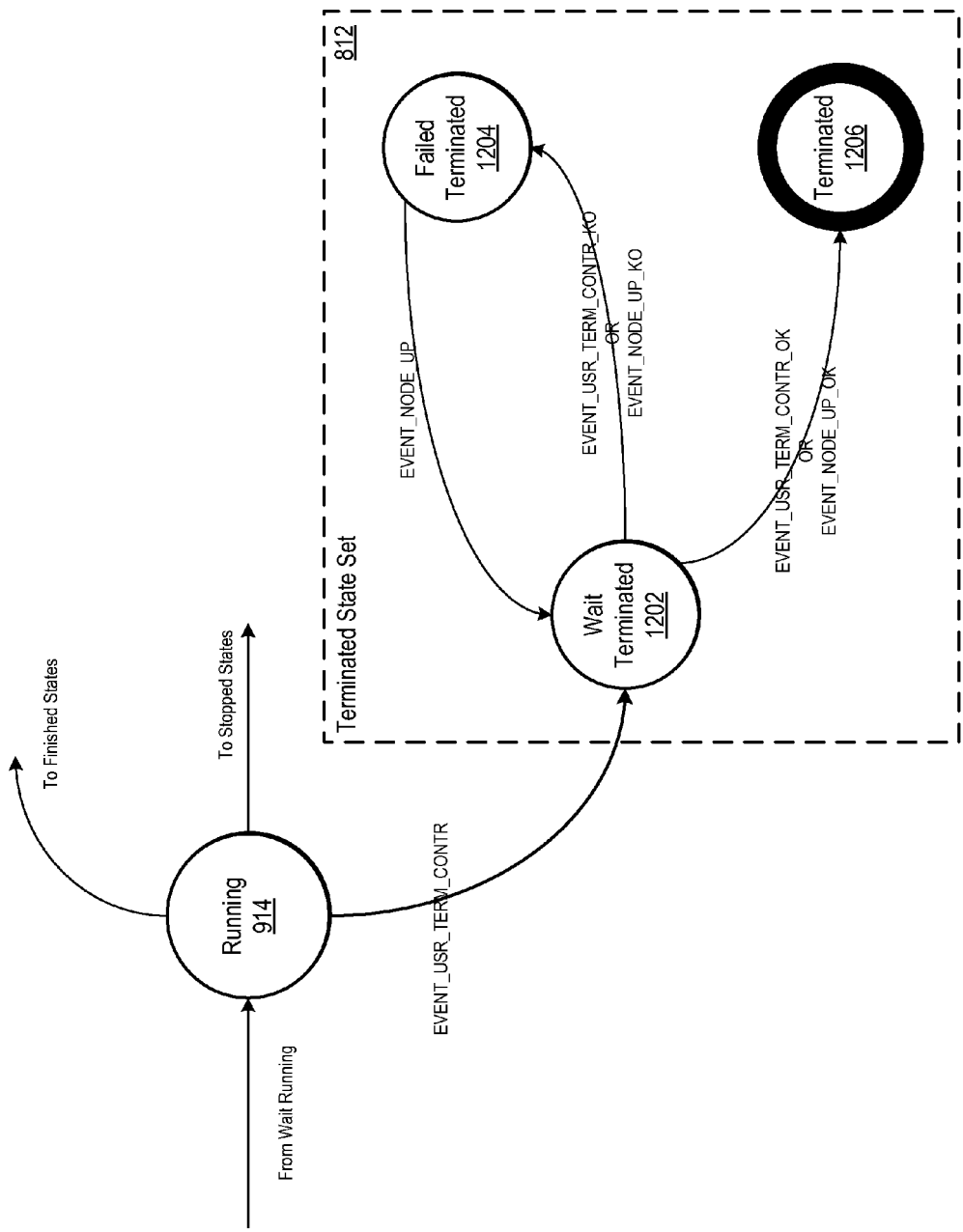
FIG. 12 shows one example of a terminated state set for the network traffic shaping control model in FIG. 8.

FIG. 12 shows one example of a terminated state set 812 for the network traffic shaping control state model 802. In one implementation, the terminated state set 812 includes a wait terminated state 1202, a failed terminated state 1204, and a terminated state 1206. The network traffic shaping control enters the terminated state set 812 when the network traffic shaping control is assigned the wait terminated state 1202. After the network traffic shaping control is assigned the wait terminated state 1202, the network traffic shaping control may then transition to one or more of the states within the terminated state set 812 according to the satisfaction of a terminating condition, such as when the network real-time monitoring and control system 102 or a user requests the termination of the network traffic control, or the satisfaction of a failing condition. Other conditions are also possible.

For transitioning between states 1202-1206 within the terminated state set 812, the terminated state set 812 may include one or more intra-terminated state transitions, such as an intra-terminated state transition between the wait terminated state 1202 and the failed terminated state 1204. Table 16 below lists state transitions established between originating states and destination states of the terminated state set 812 including: the originating state, the state transition type, the condition type that causes the transition, the network event identifier that satisfies the condition that causes the network traffic shaping control to undergo the transition, and the destination state. Table 16 also lists the transition established between the running state 914 and the wait terminated state 1202.

TABLE 16

| Originating State | Transition Type | Condition Type | Network event identifier | Destination State |
|---|---|---|---|---|
| Running | Running | Waiting | EVENT_USR_TERM_CONTR | Wait Terminated |
| Wait Terminated | Intra-terminated | Failing | EVENT_USR_TERM_CONTR_KO or EVENT_NODE_UP_KO | Failed Terminated |
| Wait Terminated | Intra-terminated | Terminating | EVENT_USR_TERM_CONTR_OK or EVENT_NODE_UP_OK | Terminated |
| Failed Terminated | Intra-terminated | Waiting | EVENT_NODE_UP | Wait Terminated |

The implementation of a network traffic shaping control may be based on the issuance of one or more control commands. In general, a control command is a command that controls a network traffic shaping control. In the implementation of the network traffic shaping control state model shown in FIGS. 9-12, control commands include an abort control command, a discard control command, a delete control command, a run control command, a finish control command, a stop control command, and a terminate control command. Each of the control commands may indicate a desired state in which to place a network traffic shaping control. For example, an abort control command may be a command that places the network traffic shaping control in the aborted state 904. Similarly, the run control command may be a command that places the network traffic shaping control in the running state 914.

A control command may be issued by one or more layers, such as the control management layer 306, with the intended recipient being another layer or another component, such as the traffic controller 602 or the node controller 604. However, there may be instances where a control command is issued by a layer and the control command does not reach, or is unable to reach, its intended recipient. Exemplary instances where a control command does not reach its intended recipient include where there is a communication failure in one or more layers of the real-time monitoring and control system 102, where the traffic controller 602 or node controller 604 has stopped responding or has suffered a terminal failure, or where one or more network nodes 114-116 have suffered an outage.

Where an outage has occurred, the control command may be issued by the network real-time monitoring and control system 102 to control a network traffic shaping control, but the control command may not be successfully executed or received by intended recipient of the control command. For example, a run control command may be issued to the traffic controller 602, but the traffic controller 602 may have suffered an outage. In this example, the traffic controller 602 may be unable to run execute the run control command and therefore transmit an acknowledgement that the traffic controller 602 has executed the run control command. Outages may also occur within the network real-time monitoring and control system 102, such as a communication failure between one or more layers 104-112. Where there is an outage between one or more layers 104-112, a control command may be issued, but the control command may not reach its intended destination, such as to another layer, to the traffic controller 602, to the node controller 604, or other component.

The potential for a loss in a control command is addressed by the implementation of the various wait states 910, 1002, 1102, 1202 shown in FIGS. 9-12. The wait states 910, 1002, 1102, 1202 place a network traffic shaping control in a waiting state until a decision is reached as to whether a control command has been successfully received or executed. In one implementation, this decision is based on whether an acknowledgement of the control command is received during a timeout period of a set period of time, such as a 1 second, 5 seconds, or any other period of time. During the timeout period, the intended recipient of the control command may transmit an acknowledgement of the control command, which in turn may trigger the generation of a network event identifier, such as the EVENT_FINE_CONTR_RTC_OK network event identifier, the EVENT_NODE_UP_OK network event identifier, or other network event identifier, that places the network traffic shaping control into an ending state, such as the discarded state 908, the finished state 1006, or any other ending state.

However, during the same timeout period, the intended recipient of the control command may not transmit an acknowledgement of the control command. Where an acknowledgement of the control command is not received during the timeout period, a network event identifier may be generated that places the network traffic shaping control into one of the failed states, such as the failed running state 912, failed finished state 1004, the failed stopped state 1104, or any other failed state. When the network traffic shaping control is placed into a failed state, the real-time monitoring and control system 102 may iteratively try to re-issue the control command that caused the network traffic shaping control to be placed into the failed state. Alternatively, the real-time monitoring and control system 102 may engage in a diagnostic analysis of the intended recipient of the control command that caused the network traffic shaping control to be placed into the failed state. The diagnostic analysis of the intended recipient may result in the restart of the intended recipient, such as where the traffic controller 602 or node controller 604 has failed, or other corrective measures to be applied, such as by transmitting an alarm or notice to the reporting layer 110. Corrective measures may also include a diagnostic analysis of one or more layers of the real-time monitoring and control system 102.

After the application of the corrective measures, the intended recipient of the control command may be identified as operating within a predetermined set of operational parameters. Where the intended recipient begins operating within operational parameters after the network traffic shaping control is placed in a failed state, a network event identifier may be generated that places the network traffic shaping control back into a waiting state. For example, when the network traffic shaping control is in the failed finished state 1004, the EVENT_NODE_UP network event identifier may be generated that places the network traffic shaping control in the wait finished state 1002. Upon return to the waiting state, the control command that caused the initial failure may be re-transmitted to the intended recipient and the timeout period may begin tolling again until an acknowledgement is received from the intended recipient. When the acknowledgement is received from the intended recipient, a network event identifier may be generated that places the network traffic shaping control into the ending state, such as the finished state 1006.

Hence, the wait states 910, 1002, 1102, 1202 address a problem where an outage may have occurred in the real-time monitoring and control system 102 and the outage has not yet been acknowledged by the real-time monitoring and control system 102. Rather than assuming that a control command has been successfully executed, which would cause the network traffic shaping control to enter an ending state, the wait states 910, 1002, 1102, 1202 place the network traffic shaping control into a waiting state until the real-time monitoring and control system 102 can verify whether the control command was executed or received successfully. Having the network traffic shaping control shaping control enter an ending state, such as the deleted state 906, the finished state 1006, or other ending state without verifying whether the control command was successfully received or executed may result in undesirable effects of the traffic flow to be shaped or being shaped by the network traffic shaping control. Accordingly, the wait states 910, 1002, 1102, and 1202 present one technical measure that addresses the problem of controlling a network traffic shaping control where an outage has occurred that has not yet been reported.

Exemplary aspects, features, and components of the system were described above. However, the system may be implemented in many different ways. For example, some features are shown stored in computer-readable memories and may be implemented with logic stored as processor-executable instructions or as data structures in a computer-readable medium. Examples of computer-readable mediums include random access memory (RAM), read-only memory (ROM), erasable and rewriteable memory, removable discs, and fixed discs. Furthermore, all or part of the system and its logic and data structures may be stored on, distributed across, or read from other machine-readable media. The media may include hard disks, floppy disks, CD-ROMs, tangible signals, such as a signal received from a network, received over multiple packets communicated across the network, or received at an antenna or other receiver.

Figure 13:
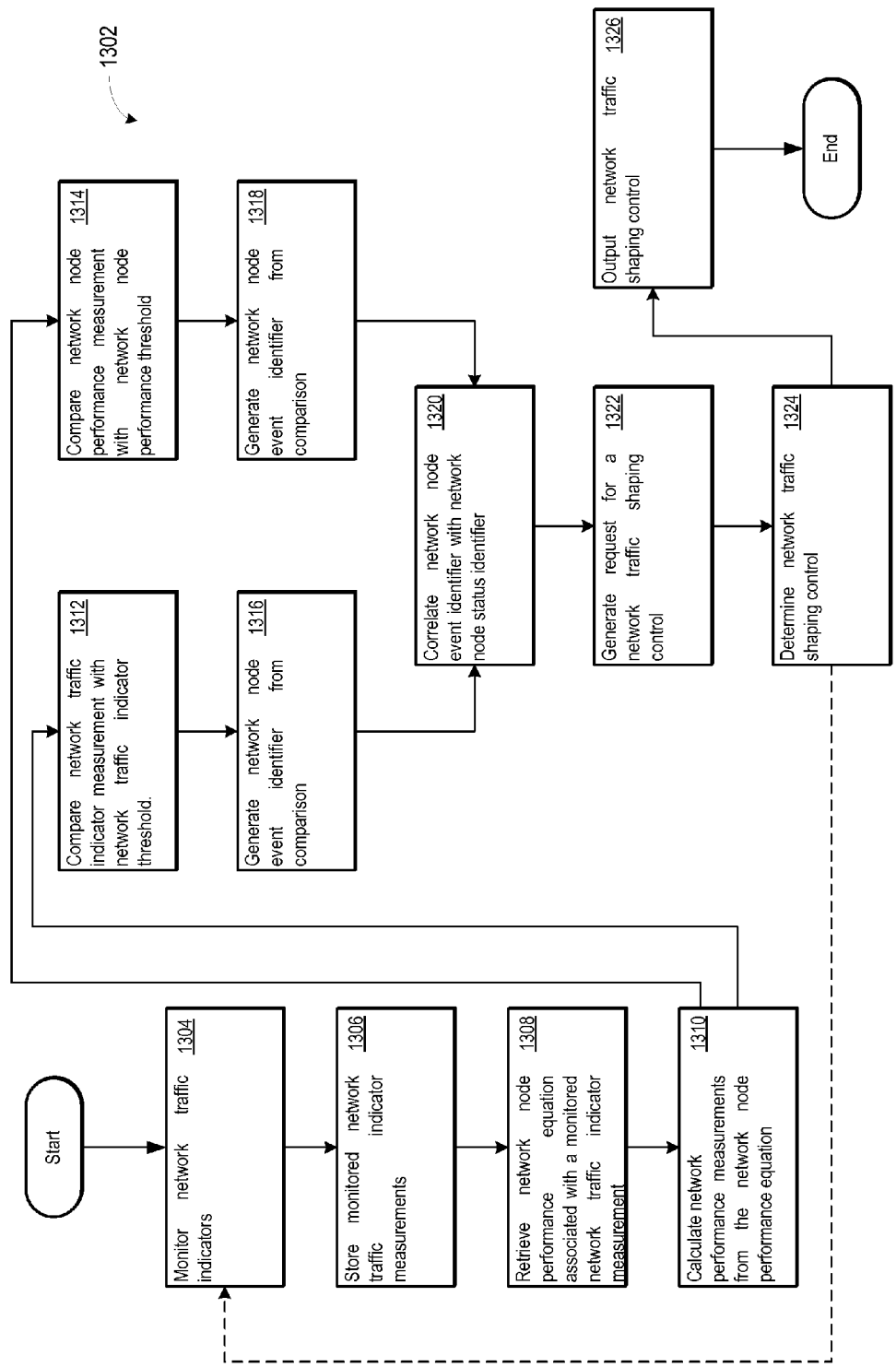
FIG. 13 shows one example of logic flow for generating a network traffic shaping control for a network traffic shaping appliance.

FIG. 13 shows one example of logic flow 1302 for generating a network traffic shaping control. With reference to FIGS. 1-3 and FIGS. 6-7, the network real-time monitoring and control system 102 may first monitor one or more traffic indicators (1304). The monitoring layer 104 may obtain network traffic indicator measurements from the network traffic probe 122, and store the network traffic indicator measurements in the monitored network traffic database 208 (1306). The event management layer 302 may retrieve one or more network traffic indicator measurements from the monitored network traffic database 208, and retrieve a network performance equation from the network performance equation and threshold profile database 308 associated with the retrieved network traffic indicator measurements (1308). Using the network traffic indicator measurements and the network performance equation, the event management layer 302 determines one or more network performance measurements (1310). The event management layer 302 may also determine network node operational performance measurements according to one or more network node operational indicator measurements.

After the network performance measurements have been obtained (1310), the event management layer 302 then retrieves one or more network traffic thresholds from the network performance equation and threshold profile database 308. The network traffic thresholds may include network traffic indicator thresholds, network traffic performance thresholds and network node operational thresholds. The retrieved one or more network traffic indicator thresholds may include warning thresholds, critical thresholds, or any other threshold. The event management layer 302 may then compare the network traffic indicator thresholds with the previously retrieved network traffic indicator measurements (1312). Alternatively, or in addition, the event management layer 302 may compare the network performance measurements with the network traffic performance thresholds (1314), or the event management layer 302 may compare the network node operational indicator measurements with network node operational indicator thresholds. Additional comparisons are also possible.

After the event management layer 302 has performed the comparison operations (1312/1314), the event management layer 302 may then generate a network event identifier according to the comparison (1316/1318). The generated network event identifier may indicate that one or more of the measurements have exceeded a threshold, such as a warning threshold or critical threshold. Alternatively, the generated network event identifier may indicate that one or more of the measurements have not exceeded a threshold. A generated network event identifier may also indicate that one or more of the network nodes 114-116 are non-responsive or that an unexpected error has occurred in the generation of the network event identifier. Other types of generated network event identifiers are also possible.

The generated network event identifier is then communicated to the real-time status analyzer 304. The real-time status analyzer 304 correlates the communicated network event identifier with a network node status identifier (1320). As previously discussed, the real-time status analyzer 304 may refer to a network node status rule set to correlate the network event identifier with a network node status identifier.

Based on the network node status identifier obtained from correlating the network event identifier, the real-time status analyzer 304 may generate a request for a network traffic shaping control (1322). The control management layer 306 receives the request for the network traffic shaping control, and determines the parameter values for the network traffic shaping control (1324). Examples of parameters for a network traffic shaping control are shown in Tables 7-8 above. The control management layer 306 then communicates the network traffic shaping control to the traffic shaping control layer 108 for execution by the node controller 604, the traffic controller 602, or both (1326).

Figure 14:
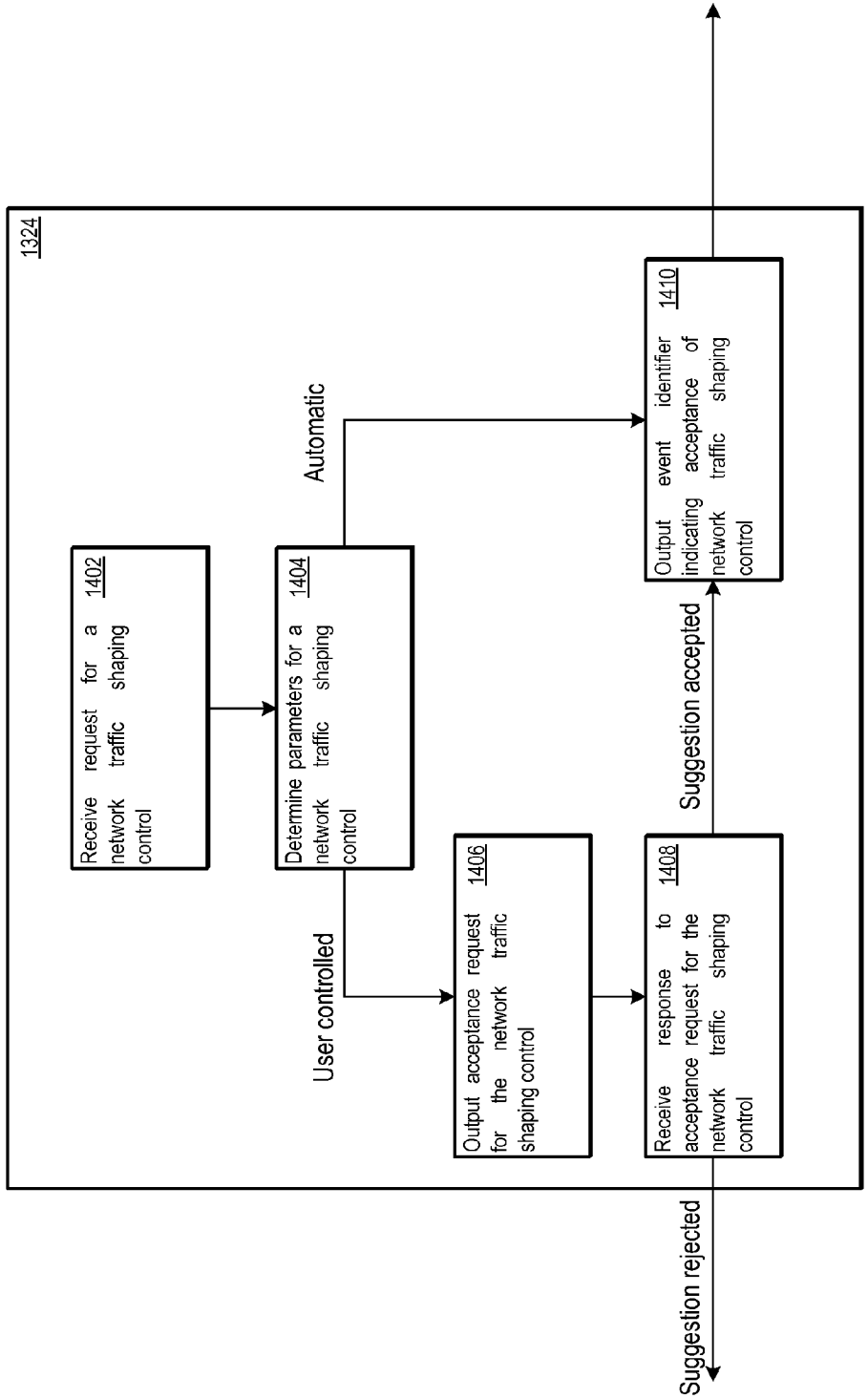
FIG. 14 shows one example of logic flow for generating a network traffic shaping control where the generated network traffic shaping control is subject to acceptance.

FIG. 14 shows one example of logic flow for generating a network traffic shaping control where the generated network traffic shaping control is subject to acceptance. Initially, the control management layer 306 receives the request for the network traffic shaping control (1402) and determines the network traffic shaping control parameters for the network traffic shaping control (1404). In an implementation where the generated network traffic shaping control is subject to user acceptance, the control management layer 306 outputs an acceptance request that requests acceptance of the generated network traffic shaping control (1406). The acceptance request may be output by the administrative layer 112 of the network real-time monitoring and control system 102. Similarly, the administrative layer 112 may be tasked with receiving a response to the acceptance request (1408). Where the response is an acceptance acknowledgement of the network traffic shaping control that indicates user acceptance of the suggested network traffic shaping control, a network event identifier may be output that indicates the suggested network traffic shaping control has been accepted (1410). The network event identifier may trigger an event where the network traffic shaping control is communicated to the traffic shaping control layer 108.

In an alternative implementation, the acceptance of the network traffic shaping control automatic. In this alternative implementation, when the network traffic shaping control is generated, the network traffic shaping control is automatically accepted and communicated to the traffic shaping control layer 108. A network event identifier may be generated that indicates that the network traffic shaping control has been automatically accepted (1410).

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may be implemented with many different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that implements functionality for a specific module as noted above. As another example, the DLL may itself provide all or some of the functionality of the system.

In addition, the system may be implemented using one or more available technologies. As mentioned throughout, the system may be implemented using the OpenNMS network management platform, the XML specification, a Java Runtime Environment ("JRE"), the JBoss application server, the Microsoft Excel spreadsheet application, the Apache Tomcat servlet container, and the PostgreSQL object-relational database management system. The system may further be implemented with alternative technologies other than those described herein.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A network real-time monitoring and control system comprising:
    a memory that stores executable instruction sets that define:
        a real-time network monitor operative to:
            monitor a network traffic flow of a network node;
            monitor a network traffic indicator associated with the network node for the monitored traffic flow; and
            store a monitored network traffic indicator measurement in a monitored network traffic database, wherein the monitored traffic indicator measurement provides a measurement of the network traffic indicator for the network node;
        an event manager operative to:
            receive the monitored network traffic indicator measurement from the monitored traffic indicator measurement database;
            receive a monitored network traffic indicator threshold associated with the monitored network traffic indicator from a monitored network traffic indicator threshold database;
            generate a network performance measurement based on the monitored network traffic indicator measurement and a network performance equation;
            request a network performance threshold from a network performance threshold profile;
            compare the generated network performance measurement with the network performance threshold;
            compare the monitored network traffic indicator measurement with the retrieved monitored network traffic indicator threshold; and
            generate a network event identifier based on the comparison of the traffic indicator measurement with the retrieved monitored network traffic indicator threshold, and the comparison of the generated network performance measurement with the network performance threshold;
        a real-time status analyzer operative to:
            receive the network event identifier from the event manager;
            correlate the network event identifier with a network node status identifier;
            generate a request for a network traffic shaping control based on the correlation of the network event identifier with the network node status identifier; and
        a control manager operative to:
            receive the request for the network traffic shaping control from the real-time status analyzer;
            receive a calculated network traffic shaping control intensity for the network traffic shaping control, wherein the network traffic shaping control intensity specifies a network traffic intensity for the monitored network traffic flow of the network node; and
            output the network traffic shaping control, wherein the network traffic shaping control includes the calculated network traffic shaping control intensity; and
    a processor that executes the executable instruction sets.

2. The network real-time monitoring and control system of claim 1 wherein the network traffic indicator comprises a network traffic input indicator that represents a particular network traffic type received by the network node.

3. The network real-time monitoring and control system of claim 1 wherein the network traffic indicator comprises a network traffic output indicator that represents a particular network traffic type output by the network node.

4. The network real-time monitoring and control system of claim 1 wherein:
   the memory further comprises a network node status rule set comprising:
      the network node status identifier that identifies an instability status of the network node; and
      a network node status condition associated with the network node status identifier that identifies the network node status identifier when the network node status condition is satisfied.

5. The network real-time monitoring and control system of claim 4 wherein the real-time status analyzer is further operative to correlate the network node status identifier by determining whether the network event identifier satisfies the network node status condition.

6. The network real-time monitoring and control system of claim 4 wherein the network node status condition is satisfied when the generated network event identifier identifies that the monitored network traffic indicator measurement has exceeded the retrieved monitored network traffic indicator threshold.

7. The network real-time monitoring and control system of claim 4 wherein:
   the network node status condition is a first network node status condition; and the network node status rule set further comprises:
      a first network node status condition priority associated with the first network node status condition that indicates a first priority level of the first network node status condition; and
      a second network node status condition priority associated with a second network node status condition that indicates a second priority level of the second network node status condition; and
      the first priority level is greater than the second priority level.

8. The network real-time monitoring and control system of claim 1 wherein the control manager is further operative to:
   determine a suggested network traffic shaping control that includes the calculated network traffic shaping control intensity;
   generate a control acceptance request that requests acceptance of the determined suggested network traffic shaping control; and
   when the control manager receives an acceptance acknowledgment of the determined suggested network traffic shaping control, the control manager outputs the determined suggested network traffic shaping control as the network traffic shaping control.

9. The network real-time monitoring and control system of claim 1 wherein the control manager is further operative to:
   receive a termination request to terminate the network traffic shaping control; and
   terminates the network traffic shaping control in response to the received termination request.

10. The network real-time monitoring and control system of claim 1 wherein:
    the monitored network traffic flow is a first monitored network traffic flow;
    a first network traffic flow priority is associated with the first monitored network traffic flow that identifies a first priority level of the first monitored network traffic flow;
    the real-time network monitor is further operative to monitor a second network traffic flow of the network node, wherein a second network traffic flow priority is associated with the second monitored network traffic flow that identifies a second priority level of the second monitored network traffic flow; and
    the network traffic shaping control is calculated based on the first monitored network traffic flow when the first network traffic flow priority is greater than the second network traffic flow priority.

11. A method of monitoring and controlling real-time network traffic comprising:
    monitoring a network traffic indicator associated with a network node for a network traffic flow;
    storing a monitored network traffic indicator measurement that provides a measurement of the network traffic indicator for the network node;
    retrieving a network performance equation that defines a network performance measurement;
    generating the network performance measurement based on the monitored network traffic indicator measurement and the requested network performance equation;
    comparing the generated network performance measurement with a network performance threshold;
    comparing the monitored network traffic indicator measurement with a monitored network traffic indicator threshold;
    generating a network event identifier based on the comparison of the traffic indicator measurement with the monitored network traffic indicator threshold, and based on the comparison of the generated network performance measurement with the network performance threshold;
    correlating the network event identifier with a network node status identifier;
    generating a request for a network traffic shaping control based on the correlation of the network event identifier with the network node status identifier; and
    calculating a network traffic shaping control intensity for the network traffic shaping control, wherein the network traffic shaping control intensity specifies a network traffic intensity for the monitored network traffic flow of the network node; and
    outputting the network traffic shaping control, wherein the network traffic shaping control includes the calculated network traffic shaping control intensity.

12. The method of claim 11 wherein the network traffic indicator comprises a network traffic input indicator that represents a particular network traffic type received by the network node.

13. The method of claim 11 wherein the network traffic indicator comprises a network traffic output indicator that represents a particular network traffic type output by the network node.

14. The method of claim 11 further comprising:
    defining a network node status rule set comprising:
       the network node status identifier that identifies an instability status of the network node; and
       a network node status condition associated with the network node status identifier that identifies the network node status identifier when the network node status condition is satisfied.

15. The method of claim 14 claim wherein correlating the network event identifier with the network node status identifier comprises:
   determining whether the network event identifier satisfies the network node status condition.

16. The method of claim 14 further comprising:
   satisfying the network node status condition when the generated network event identifier identifies that the monitored network traffic indicator measurement has exceeded the retrieved monitored network traffic indicator threshold.

17. The method claim 14 wherein:
   the network node status condition is a first network node status condition; and
   the network node status rule set further comprises:
      a first network node status condition priority associated with the first network node status condition that indicates a first priority level of the first network node status condition; and
      a second network node status condition priority associated with a second network node status condition that indicates a second priority level of the second network node status condition; and
   the first priority level is greater than the second priority level.

18. The method of claim 11 further comprising:
   determining a suggested network traffic shaping control that includes the calculated network traffic shaping control intensity;
   generating a control acceptance request that requests acceptance of the determined suggested network traffic shaping control; and
   when an acceptance acknowledgment of the determined suggested network traffic shaping control is received, outputting the determined suggested network traffic shaping control as the network traffic shaping control.

19. The method of claim 11 further comprising:
   receiving a termination request to terminate the network traffic shaping control; and
   terminating the network traffic shaping control in response to the received termination request.

20. The method of claim 11 wherein:
   the monitored network traffic flow is a first monitored network traffic flow;
   a first network traffic flow priority is associated with the first monitored network traffic flow that identifies a first priority level of the first monitored network traffic flow; and
further comprising:
   monitoring a second network traffic flow of the network node, wherein a second network traffic flow priority is associated with the second monitored network traffic flow that identifies a second priority level of the second monitored network traffic flow; and
   calculating the network traffic shaping control for the first monitored network traffic flow when the first network traffic flow priority is greater than the second network traffic flow priority.

* * * * *